(12) United States Patent
Keeler et al.

(10) Patent No.: US 9,738,131 B2
(45) Date of Patent: Aug. 22, 2017

(54) AIR SPRING WITH DAMPING CHARACTERISTICS FOR HEAVY-DUTY VEHICLES

(71) Applicant: Hendrickson USA, L.L.C., Itasca, IL (US)

(72) Inventors: Michael J. Keeler, Naperville, IL (US); Jeff R. Zawacki, Channahon, IL (US); Andrew J. Westnedge, Granville, OH (US); Jason M. Ramus, Canton, OH (US); Jacob Andreasen, Akron, OH (US); Nicholas J. Giamati, Akron, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 15/150,505

(22) Filed: May 10, 2016

(65) Prior Publication Data

US 2016/0332497 A1 Nov. 17, 2016

Related U.S. Application Data

(60) Provisional application No. 62/159,528, filed on May 11, 2015.

(51) Int. Cl.
*B60G 15/12* (2006.01)
*B60G 11/27* (2006.01)
(Continued)

(52) U.S. Cl.
CPC .............. *B60G 15/12* (2013.01); *B60G 11/27* (2013.01); *F16F 9/049* (2013.01); *F16F 9/057* (2013.01);
(Continued)

(58) Field of Classification Search
CPC .......... B60G 15/12; B60G 11/27; F16F 9/049; F16F 9/057; F16J 3/06
See application file for complete search history.

(56) References Cited

U.S. PATENT DOCUMENTS 1,516,004 A 11/1924 Eckrode et al.
2,012,061 A 8/1935 Demant
(Continued)

FOREIGN PATENT DOCUMENTS

DE 102009051944 A1 11/2009
EP 0166702 A2 1/1986
(Continued)

*Primary Examiner* — Vishal Sahni
(74) *Attorney, Agent, or Firm* — Dureska & Moore, LLC; David P. Dureska; Brent L. Moore

(57) ABSTRACT

An air spring with damping characteristics for a suspension assembly of a heavy-duty vehicle includes a bellows and a piston. The bellows includes a bellows chamber. The bellows is attached to a main member of the heavy-duty vehicle and to the piston. The piston includes an open bottom that is sealingly closed by a disc attached to the open bottom. The piston and the disc define a piston chamber. The piston is mounted on the suspension assembly of the heavy-duty vehicle. The bellows chamber and the piston chamber are in fluid communication with each other via at least one opening, wherein airflow between the bellows chamber and the piston chamber provides damping to the suspension assembly of the heavy-duty vehicle.

24 Claims, 12 Drawing Sheets

(51) Int. Cl.
*F16J 3/06* (2006.01)
*F16F 9/04* (2006.01)
*F16F 9/05* (2006.01)

(52) U.S. Cl.
CPC ........... *F16J 3/06* (2013.01); *B60G 2202/152* (2013.01); *B60G 2202/32* (2013.01); *B60G 2206/424* (2013.01); *B60G 2206/911* (2013.01); *B60G 2300/02* (2013.01); *B60G 2300/026* (2013.01)

(56) References Cited

U.S. PATENT DOCUMENTS

| | | |
|---|---|---|
| 2,012,291 A | 8/1935 | Tuttle |
| 2,014,016 A | 9/1935 | Crafts |
| 2,694,569 A | 11/1954 | Gouirand |
| 2,984,476 A | 5/1961 | Turner |
| 3,395,931 A | 8/1968 | Piret |
| 4,493,481 A | 1/1985 | Merkle |
| 4,752,308 A | 6/1988 | Brandl et al. |
| 4,844,428 A | 7/1989 | Margolis et al. |
| 4,934,667 A | 6/1990 | Pees et al. |
| 5,234,203 A | 8/1993 | Smith |
| 5,366,048 A | 11/1994 | Watanabe et al. |
| 5,382,006 A | 1/1995 | Arnold |
| 5,954,316 A | 9/1999 | Voss |
| 6,386,524 B1 | 5/2002 | Levy et al. |
| 6,715,744 B2 | 4/2004 | Bell |
| 8,540,222 B2 | 9/2013 | Westnedge et al. |
| 9,157,529 B2 | 10/2015 | Westnedge et al. |
| 2006/0186586 A1 | 8/2006 | Soles et al. |
| 2010/0096786 A1 | 4/2010 | Orlamunder et al. |
| 2011/0049774 A1 | 3/2011 | Naber |
| 2011/0115140 A1* | 5/2011 | Moulik .................. B60G 15/14 267/64.23 |
| 2012/0061887 A1* | 3/2012 | Westnedge ............. B60G 11/27 267/64.24 |
| 2012/0291626 A1* | 11/2012 | Westnedge ............. B60G 9/003 92/181 R |
| 2014/0167337 A1* | 6/2014 | Ramsey .................. F16F 9/057 267/124 |

FOREIGN PATENT DOCUMENTS

| | | |
|---|---|---|
| EP | 0474171 A1 | 9/1991 |
| EP | 0914976 A1 | 5/1999 |
| GB | 2333576 A | 7/1999 |
| WO | 9421487 | 9/1994 |
| WO | 0161207 A1 | 8/2001 |
| WO | 2013181241 A1 | 12/2013 |

* cited by examiner

AIR SPRING WITH DAMPING CHARACTERISTICS FOR HEAVY-DUTY VEHICLES

CROSS-REFERENCE TO RELATED APPLICATION

This application claims the benefit of U.S. Provisional Patent Application Ser. No. 62/159,528, filed May 11, 2015.

BACKGROUND OF THE INVENTION

Field of the Invention

The invention relates generally to the art of axle/suspension systems for heavy-duty vehicles. More particularly, the invention relates to air-ride axle/suspension systems for heavy-duty vehicles, which utilize an air spring to cushion the ride of the vehicle. More specifically, the invention is directed to the conversion of a non-damping air spring to an air spring with damping characteristics, which is accomplished by sealing the non-damping air spring piston to create a piston chamber and providing fluid communication between the piston chamber and a bellows chamber of the air spring in order to provide damping characteristics to the air spring.

Background Art

The use of one or more air-ride trailing and leading arm rigid beam-type axle/suspension systems has been popular in the heavy-duty truck and tractor-trailer industry for many years. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members, which form the frame of the vehicle. More specifically, each beam is pivotally connected at one of its ends to a hanger, which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The opposite end of each beam also is connected to an air spring, or its equivalent, either directly or via a pedestal, and the air spring is in turn connected to a respective one of the main members. The air spring cushions the ride of the axle/suspension system during operation and, in some cases, provides damping characteristics. In those cases where the air spring does not provide damping, one or more shock absorbers are employed to provide damping. A height control valve is mounted on the hanger or other support structure and is operatively connected to the beam and to the air spring in order to maintain the ride height of the vehicle. A brake system is also included on the vehicle axle/suspension system. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental effect of these forces on the vehicle and/or its cargo as it is operating, the axle/suspension system is designed to react and/or absorb at least some of them.

These forces include vertical forces caused by vertical movement of the wheels as they encounter certain road conditions, fore-aft forces caused by acceleration and deceleration of the vehicle due to operation of the vehicle and/or road conditions, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system. It is also desirable to dampen the vibrations or oscillations that result from such forces in order to reduce wheel and/or suspension bounce, which in turn can potentially harm the wheels and the components of the axle/suspension system, thereby reducing optimal ride characteristics of the axle/suspension system and the life of the components of the axle/suspension system. A key component of the axle/suspension system that cushions the ride of the vehicle from vertical impacts is the air spring or other spring mechanism, such as a coil spring or a leaf spring, while a shock absorber typically provides damping to the axle/suspension system. In some instances, the air spring can also provide damping to the axle/suspension system.

The typical air spring of the type utilized in heavy-duty air-ride axle/suspension systems includes three main components: a flexible bellows, a bellows top plate, and a piston. The bellows is typically formed from rubber or other flexible material, and is sealingly engaged with the bellows top plate and also to the top portion of the piston. The volume of pressurized air, or "air volume", that is contained within the air spring is a major factor in determining the spring rate of the air spring. More specifically, this air volume is contained within the bellows and, in some cases, the piston of the air spring. Usually, the larger the air volume of the air spring, the lower the spring rate of the air spring. A lower spring rate is generally more desirable in the heavy-duty vehicle industry because it allows for softer ride characteristics for the vehicle. Typically, the piston either contains a hollow cavity, which is in communication with the bellows and which adds to the air volume of the air spring by allowing unrestricted communication of air between the piston and the bellows volumes, or the piston has a generally hollow cylindrical-shape and does not communicate with the bellows volume, whereby the piston does not contribute to the air volume of the air spring. In any event, the air volume of the air spring is in fluid communication with an air source, such as an air supply tank, and also is in fluid communication with the height control valve of the vehicle. The height control valve, by directing air flow into and out of the air spring of the axle/suspension system, helps maintain the desired ride height of the vehicle. Most prior art air springs of the non-damping variety utilize a "molded-in" end closure that is attached to the top plate of the piston by a fastener. In this design, the bottom end of the bellows is integrally molded with a metal end closure, so that the end closure is typically not removable from the bellows. These types of air springs make up a majority of the non-damping air spring market and typically do not exhibit the disadvantages of the "take-apart" design described below.

Prior art air springs such as the one described above, while providing cushioning to the vehicle cargo and occupant(s) during operation of the vehicle, provide little if any damping characteristics to the axle/suspension system. Such damping characteristics are instead typically provided by a pair of hydraulic shock absorbers, although a single shock absorber has also been utilized and is generally well known in the art. Each one of the shock absorbers is mounted on and extends between the beam of a respective one of the suspension assemblies of the axle/suspension system and the hanger mounted on a respective one of the main members of the vehicle. These shock absorbers add complexity and weight to the axle/suspension system. Moreover, because the shock absorbers are a service item of the axle/suspension system that will require maintenance and/or replacement from time to time, they also add additional maintenance and/or replacement costs to the axle/suspension system.

The amount of cargo that a vehicle may carry is governed by local, state, and/or national road and bridge laws. The basic principle behind most road and bridge laws is to limit the maximum load that a vehicle may carry, as well as to limit the maximum load that can be supported by individual axles. As a result, the weight of the shock absorbers undesirably reduces the amount of cargo that can be carried by the heavy-duty vehicle. Depending on the shock absorbers employed, they also add varying degrees of complexity to the axle/suspension system, which is also undesirable.

Because of the undesirable increased weight to the axle/suspension system attributed to the shock absorbers, prior art air springs with damping characteristics were developed. Prior art air springs with damping characteristics enabled removal of the shock absorbers while maintaining desirable soft ride characteristics. More specifically, prior art air springs with damping characteristics typically included openings between the bellows and the piston in order to allow fluid communication between the volume of the bellows chamber and the volume of the piston chamber. This fluid communication between the bellows chamber volume and the piston chamber volume provided damping characteristics to the air spring while maintaining a soft ride to the vehicle during operation. Prior art air springs with damping characteristics are typically of the "take-apart" design variety, meaning that the bottom end of the bellows of the air spring is operatively connected to a protrusion that extends upwardly from the piston top plate that is formed with a barb. In these types of air springs, the bellows can be taken apart from the piston. However, air springs having the "take-apart" design are limited during rebound travel and jounce travel and can experience fold in issues in "low pressure" or "no air" situations.

Although prior art air springs with damping characteristics provide a softer ride during vehicle operation, they typically require a custom designed air spring piston for each specific application. More specifically, each anticipated use of the axle/suspension system requires certain damping characteristics, which, in turn, requires a different air spring configuration. As a result, each prior art air spring with damping characteristics requires a different custom design and manufacturing process. This leads to undesirable increases in both design and manufacturing costs and an undesirable increase in production time for the air spring. Moreover, the "take-apart" design of the air springs with damping characteristics potentially limits rebound travel and jounce travel and potentially exacerbates fold in issues in "low pressure" or "no air" situations. The air spring for heavy-duty vehicles of the present invention overcomes the problems associated with prior art non-damping air springs by removing the prior art shock absorber and converting the non-damping air spring with a "molded-in" end closure into an air spring that provides damping characteristics. It also allows for the use of different piston/pedestal combinations to be used in the air spring so that the volume of the piston can be varied along with the opening size between the piston chamber and the bellows chamber to optimize the damping characteristics of the air spring. Additionally, the air spring for heavy-duty vehicles of the present invention provides an air spring with damping characteristics that may be optimized for different uses without requiring custom design and manufacturing of the air springs for each specific use, as is typically required by prior art air springs with damping characteristics.

SUMMARY OF THE INVENTION

Objectives of the present invention include providing an air spring with damping characteristics for heavy-duty vehicles that enables removal of shock absorbers while maintaining desirable soft ride and damping characteristics.

Another objective of the present invention is to provide an air spring with damping characteristics for heavy-duty vehicles that in certain applications is free of the "take-apart" design so that the air spring does not experience fold in issues in "lower pressure" or "no air" situations.

A further objective of the present invention is to provide an air spring with damping characteristics for heavy-duty vehicles that enables one to convert a non-damping air spring with a "molded-in" or "take-apart" end closure into an air spring providing damping characteristics.

Yet another objective of the present invention is to provide an air spring with damping characteristics for heavy-duty vehicles that allows for the use of different piston/pedestal combinations to be used in the air spring, so that the volume of the piston can be varied along with the opening size between the piston chamber and the bellows chamber to optimize the damping characteristics of the air spring.

Still another objective of the present invention is to provide an air spring with damping characteristics for heavy-duty vehicles that may be optimized for different uses without requiring custom design and manufacturing of the air springs for each specific use.

These objectives and advantages are obtained by the air spring with damping characteristics for heavy-duty vehicles of the present invention which includes a bellows and a piston. The bellows includes a bellows chamber and is attached to a main member of the heavy-duty vehicle, and to the piston. The piston having an open bottom which is sealingly closed by a disc attached to it, whereby the piston and the disc define a piston chamber. The bellows chamber and the piston chamber are in fluid communication with each other via at least one opening, wherein airflow between the bellows chamber and the piston chamber provides damping to the suspension assembly of the heavy-duty vehicle.

These objectives and advantages are also obtained by the method for converting a non-damping air spring into an air spring with damping characteristics for a suspension assembly of a heavy-duty vehicle, comprising the following steps, a) providing a bellows and a piston, the bellows including a bellows chamber, the bellows chamber attached to a main member of the heavy-duty vehicle and attached to the piston, the piston having an open bottom, b) sealingly closing the open bottom of the piston by attaching a disc to the open bottom, whereby the piston and the disc define a piston chamber, the piston mounted on the suspension assembly of the heavy-duty vehicle, the bellows chamber and the piston chamber being in fluid communication with each other via at least one opening, wherein airflow between the bellows chamber and the piston chamber provides damping to the suspension assembly of the heavy-duty vehicle.

BRIEF DESCRIPTION OF THE SEVERAL VIEWS OF THE DRAWINGS

The preferred embodiments of the present invention, illustrative of the best mode in which applicants have contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENT

Figure 1:
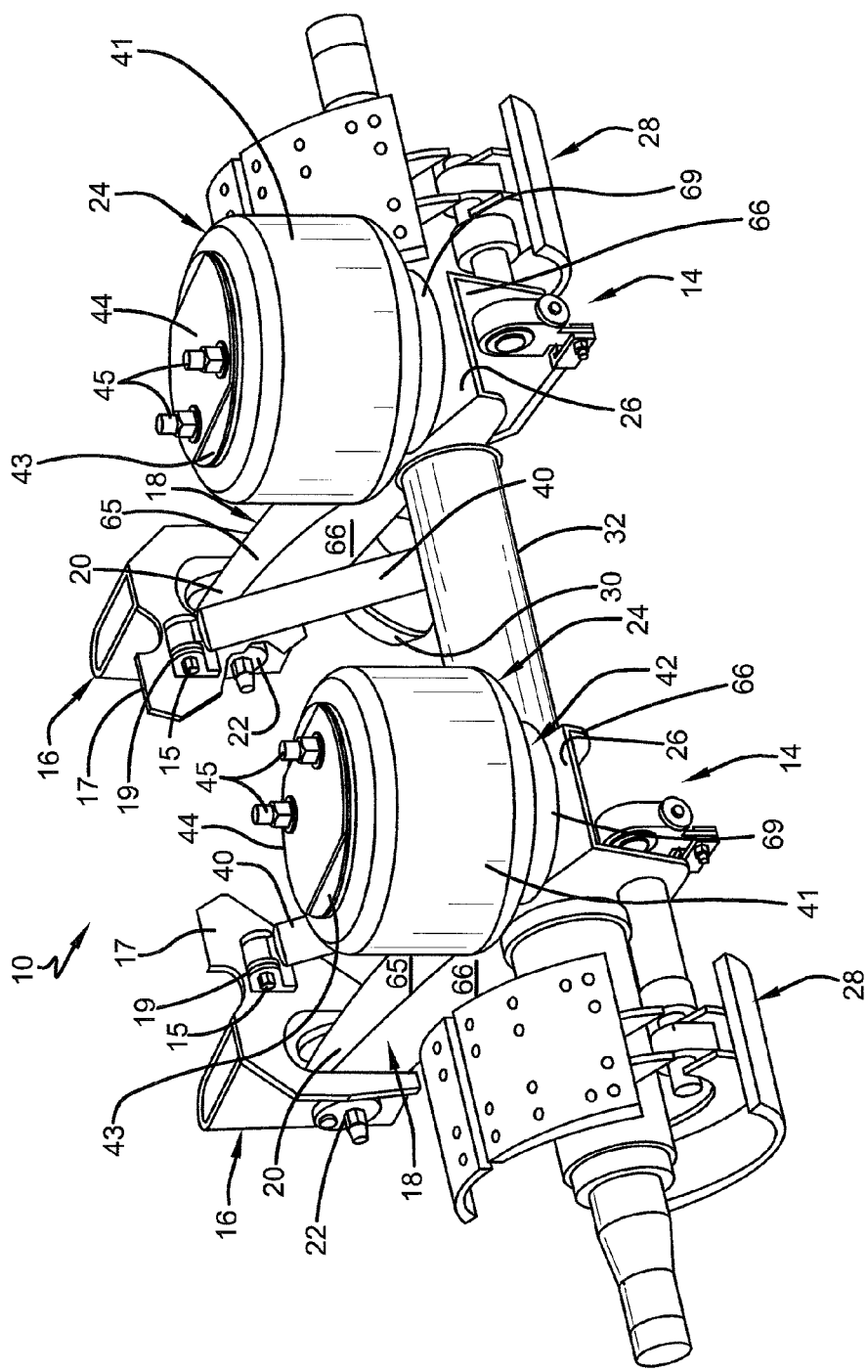
FIG. 1 is a top rear driver side perspective view of an axle/suspension system incorporating a pair of prior art non-damping air springs, showing each air spring mounted directly to a respective one of the axle/suspension system beams, and further showing a pair of shock absorbers, with each one of the pair of shock absorbers mounted on a respective one of the suspension assemblies of the axle/suspension system.
Figure 2:
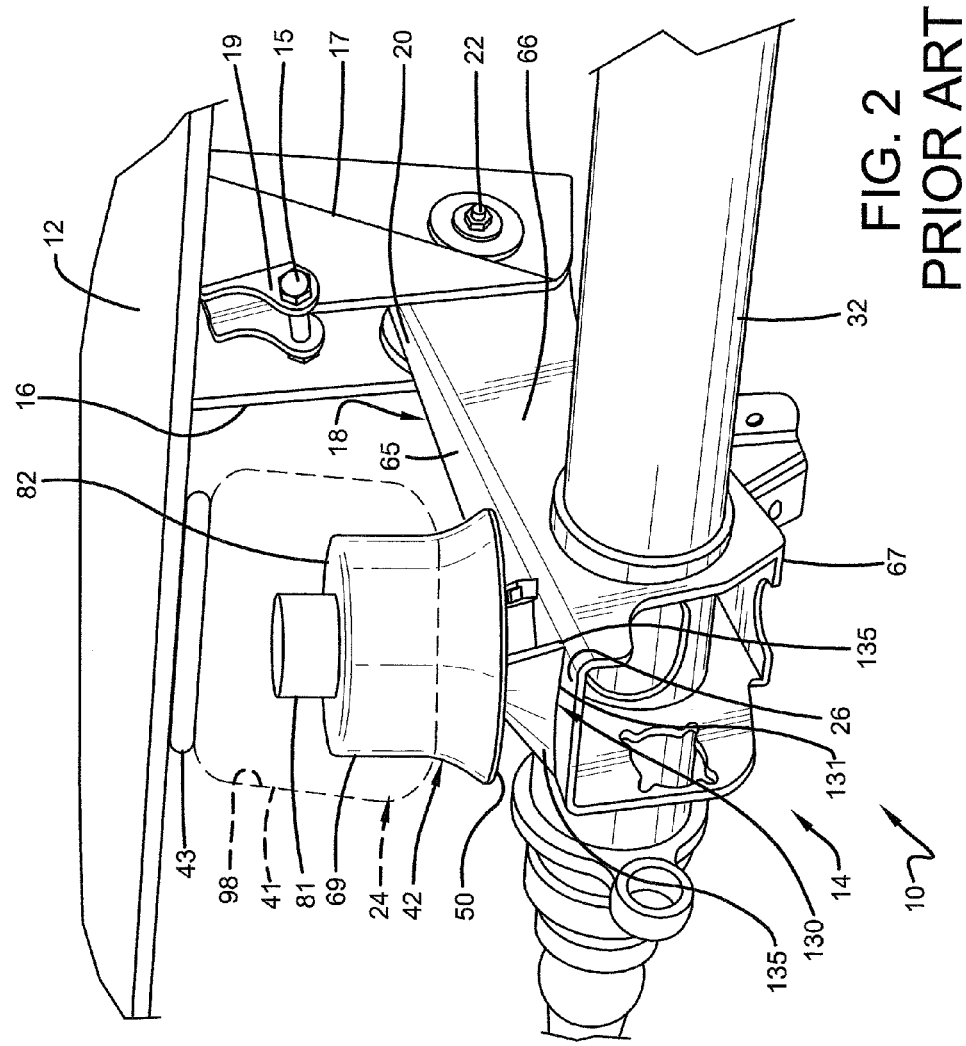
FIG. 2 is a fragmentary rear perspective view of the axle/suspension system shown in FIG. 1 incorporating an alternative prior art non-damping air spring that utilizes a beam mounting pedestal, and showing a piston of the air spring attached to the beam utilizing the beam mounting pedestal.

In order to better understand the environment in which the air spring with damping characteristics for a heavy-duty vehicle of the present invention is utilized, a trailing arm overslung beam-type air-ride axle/suspension system that incorporates a prior art air spring 24, is indicated generally at 10, is shown in FIGS. 1 and 2, and now will be described in detail below.

It should be noted that axle/suspension system 10 is typically mounted on a pair of longitudinally-extending spaced-apart main members 12 (FIG. 2, only one shown) of a heavy-duty vehicle, which is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. Because axle/suspension system 10 generally includes an identical pair of suspension assemblies 14, for sake of clarity only one of the suspension assemblies will be described below.

Suspension assembly 14 is pivotally connected to a hanger 16 via a trailing arm overslung beam 18. More specifically, beam 18 is formed having a generally upside-down integrally formed U-shape with a pair of sidewalls 66 and a top plate 65, with the open portion of the beam facing generally downwardly. A bottom plate 67 (FIG. 2) extends between and is attached to the lowermost ends of sidewalls 66 by any suitable means such as welding to complete the structure of beam 18. Trailing arm overslung beam 18 includes a front end 20 having a bushing assembly 22, which includes a bushing, pivot bolts and washers as are well known in the art, to facilitate pivotal connection of the beam to hanger 16. Beam 18 also includes a rear end 26, which is welded or otherwise rigidly attached to a transversely-extending axle 32.

Figure 3:
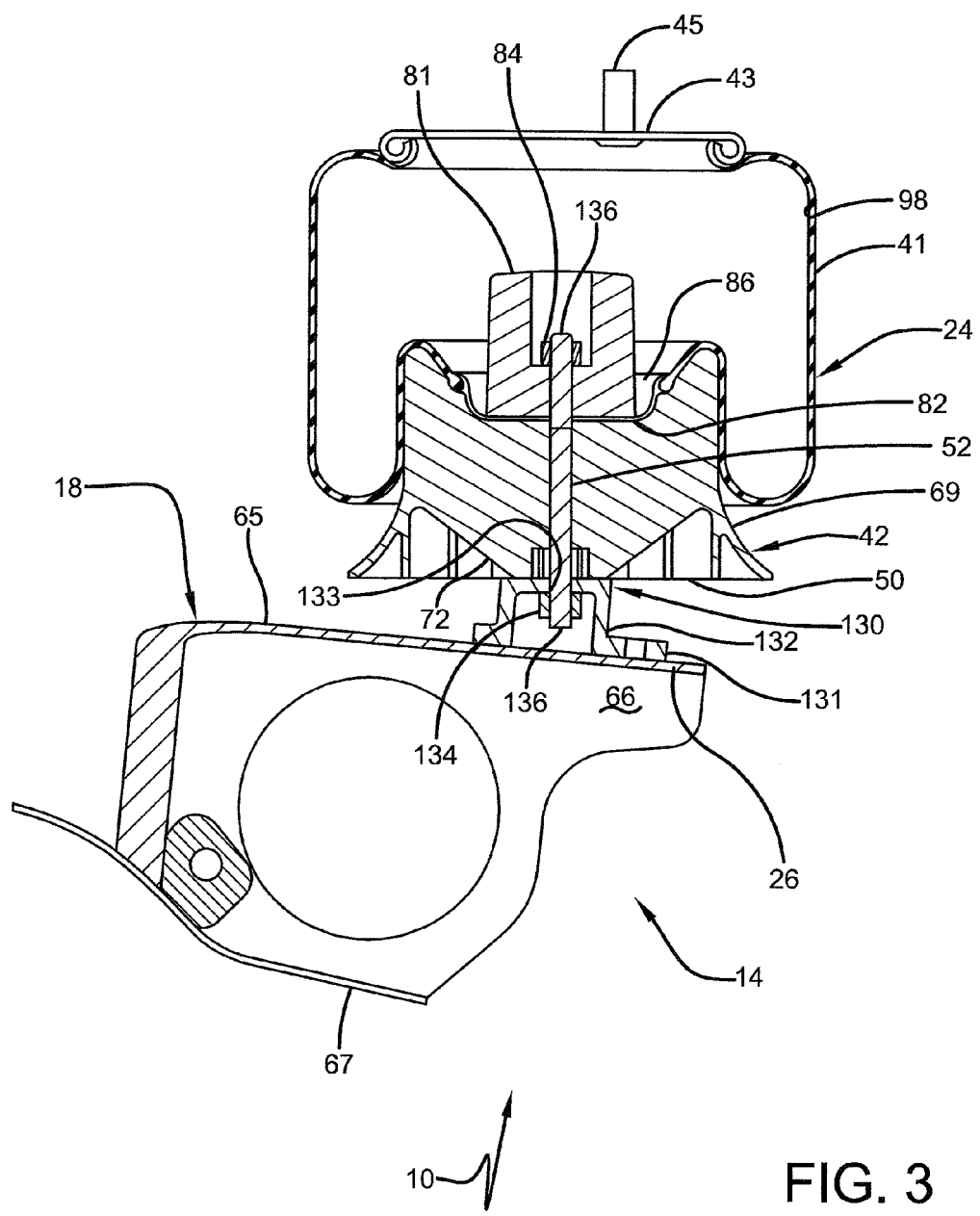
FIG. 3 is a fragmentary elevation view, in section, of the axle/suspension system and the prior art non-damping air spring shown in FIG. 2, and showing the piston of the air spring attached to the beam utilizing the beam mounting pedestal.

With continued reference to FIGS. 1 and 2 and with additional reference to FIG. 3, suspension assembly 14 also includes air spring 24, mounted on and extending between beam rear end 26 and main member 12 (FIG. 2). Air spring 24 includes a bellows 41 and a piston 42. The top portion of bellows 41 is sealingly engaged with a bellows top plate 43. An air spring mounting plate 44 (FIGS. 1 and 2) is mounted on bellows top plate 43 by fasteners 45 which are also used to mount the top portion of air spring 24 to the vehicle main member 12. Piston 42 is generally cylindrical-shaped and includes a sidewall 69, a generally flat bottom plate 50, and a top plate 82. The bottom portion of bellows 41 is sealingly engaged with piston top plate 82 in a manner well known in the art utilizing a "molded-in" end closure or retaining plate 86.

As shown in FIGS. 2 and 3, prior art non-damping air spring 24 includes a bumper 81 that is mounted on piston top plate 82 by a nut 84 which is threaded onto a fastener 136. Bumper 81 serves as a cushion between piston top plate 82 and the underside of bellows top plate 43 in order to prevent the plates from damaging one another during operation of the vehicle during "low pressure" or "no air" events.

With particular reference to FIG. 3, piston 42 of prior art air spring 24 is formed with a central hub 52 attached to sidewall 69 in a well-known manner. A plurality of ribs 72 extend radially between hub 52 and sidewall 69 to provide structural support to prior art air spring 24.

A first configuration for mounting piston bottom plate 50 directly to beam top plate 65 at beam rear end 26 is shown generally in FIG. 1. In this configuration bottom plate 50 of piston 42 is attached directly to beam rear end 26 via fasteners (not shown). A second configuration for mounting prior art air spring 24 to beam 18 will be discussed below in connection with FIGS. 2 and 3.

As shown in FIGS. 2-3, prior art air spring 24 may alternatively be mounted on beam 18 via a beam mounting pedestal 130. With particular reference to FIG. 3, more specifically, beam mounting pedestal 130 includes a generally flat base 131 for contacting and seating on beam top plate 65 at beam rear end 26. Beam mounting pedestal 130 further includes an upwardly extending column 132, which is formed with an opening 133. Fastener 136 is disposed through opening 133 and a nut 134 is threaded onto the fastener to attach piston 42 to beam mounting pedestal 130 as known in the art. A pair of strengthening webs 135 (FIG. 2) extend outwardly from column 132 on flat base 131. A pair of openings (not shown) are formed in flat base 131. Each opening (not shown) receives a fastener (not shown) for attaching beam mounting pedestal 130 to beam top plate 65 at beam rear end 26. It should be understood that other types of beam mounting attachments having different structures are also known in the art and are used to mount the air spring to the beam.

With continued reference to FIGS. 2-3, prior art air spring 24 includes bellows top plate 43, piston top plate 82, and bellows 41 defining a bellows chamber 98. Because the bottom of piston 42 is open and the piston does not communicate with bellows chamber 98, the piston does not generally contribute any appreciable volume to air spring 24.

Referring now to FIGS. 1 and 2, the top end of a shock absorber 40 (FIG. 1) is mounted on an inboardly extending wing 17 of hanger 16 via a mounting bracket 19 and a fastener 15, in a manner well known in the art. The bottom end of shock absorber 40 is mounted to beam 18 (the mount not shown) in a manner well known to those having skill in the art. For the sake of relative completeness, a brake system 28 including a brake chamber 30 is shown mounted on prior art suspension assembly 14.

As mentioned above, axle/suspension system 10 is designed to absorb forces that act on the vehicle as it is operating. More particularly, it is desirable for axle/suspension system 10 to be rigid or stiff in order to resist roll forces and thus provide roll stability for the vehicle. This is typically accomplished by using beam 18, which is rigid, and also is rigidly attached to axle 32. It is also desirable, however, for axle/suspension system 10 to be flexible to assist in cushioning the vehicle (not shown) from vertical impacts and to provide compliance so that the axle/suspension system resists failure. Such flexibility typically is achieved through the pivotal connection of beam 18 to hanger 16 with bushing assembly 22. Air spring 24 and shock absorber 40 also assist in cushioning the ride for cargo and passengers.

Prior art air spring 24 has very limited or no damping capabilities because its structure, as described above, does not provide for the same. Instead, prior art air spring 24 relies on shock absorbers 40 to provide damping to axle/suspension system 10. Because each shock absorber 40 is relatively heavy, this adds weight to axle/suspension system 10 and therefore reduces the amount of cargo that can be carried by the heavy-duty vehicle. Shock absorbers 40 also add complexity to axle/suspension system 10. Moreover, because shock absorbers 40 are a service item of axle/suspension system 10 that will require maintenance and/or replacement from time to time, they also add additional maintenance and/or replacement costs to the axle/suspension system.

Figure 4:
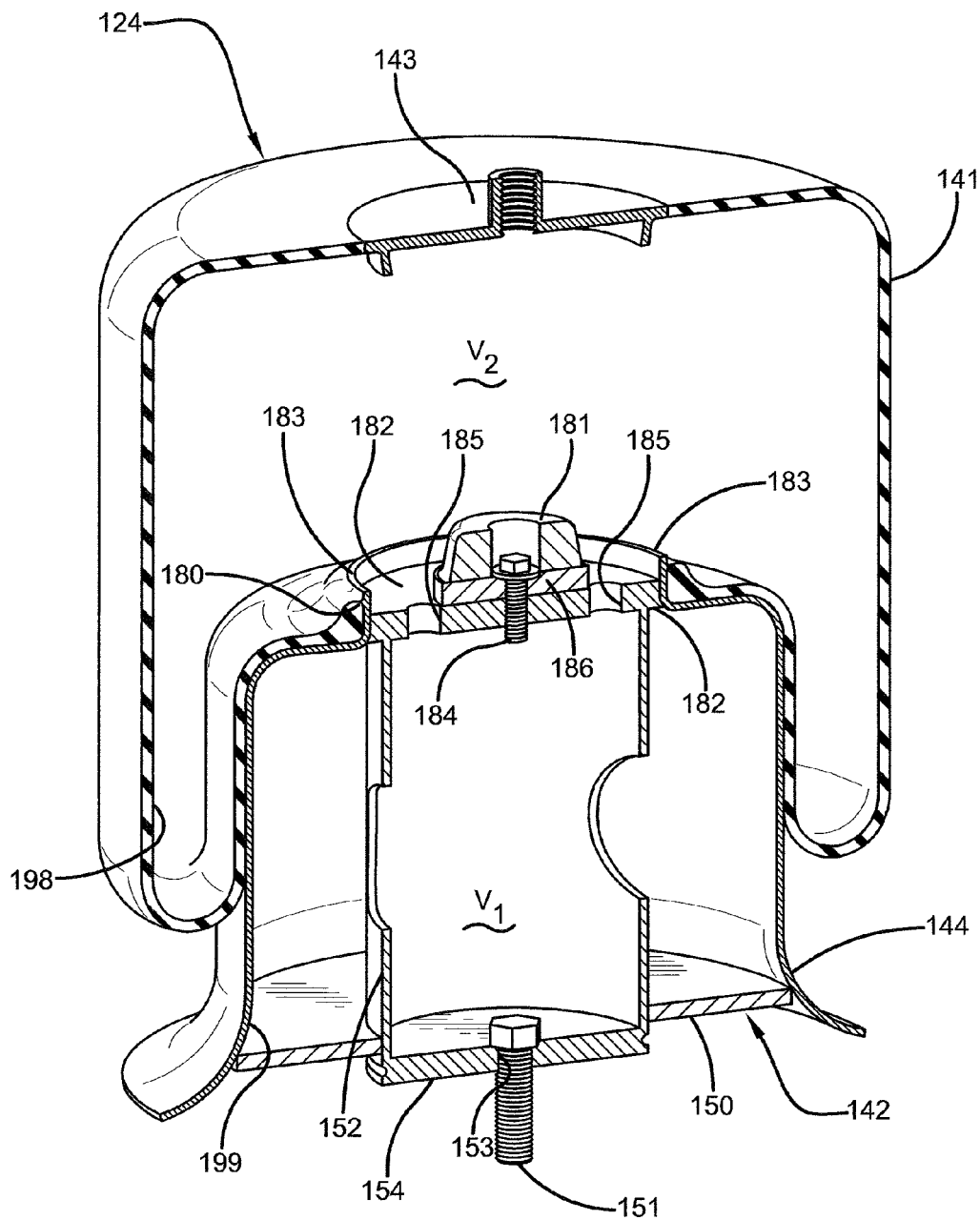
FIG. 4 is a perspective view of a prior art air spring with damping characteristics in section, showing a pair of openings in a piston top plate that facilitate fluid communication between a piston chamber and a bellows chamber of the air spring.

Turning now to FIG. 4, a prior art air spring 124 with damping characteristics is shown, which is typically used without shock absorbers. Prior art air spring 124 is typically incorporated into an axle/suspension system such as axle/suspension system 10 (FIG. 1), or other similar air-ride axle/suspension systems. Air spring 124 includes a bellows 141, a bellows top plate 143, and a piston 142. The top end of bellows 141 is sealingly engaged with bellows top plate 143 in a manner well known in the art. An air spring mounting plate (not shown) is typically mounted on the top surface of bellows top plate 143 by fasteners (not shown) which are also used to mount the top portion of air spring 124 to a respective one of the main members (not shown) of the vehicle. Alternatively, bellows top plate 143 could also be mounted directly on a respective one of the main members (not shown) of the vehicle.

Piston 142 is generally cylindrical-shaped and includes a sidewall 144 attached to a generally flat bottom plate 150. Piston 142 also includes a top plate 182. Bottom plate 150 is formed with an upwardly extending central hub 152 and is attached to sidewall 144 in a well-known manner. Central hub 152 includes a bottom plate 154 formed with a central opening 153. A fastener 151 is disposed through opening 153 and is utilized to attach piston 142 directly to the beam (not shown), similar to the mount of prior art air spring 24 shown in FIG. 1.

Piston top plate 182, sidewall 144, and bottom plates 150 and 154 of piston 142 define a piston chamber 199. Sidewall 144 of piston 142 includes a circular upwardly extending protrusion 183 having a lip or barb 180 around its circumference. Barb 180 cooperates with the bottom terminal end of bellows 141 to form an airtight seal between the bellows and the barb around the circumference of protrusion 183 of piston 142, as is well known to those of ordinary skill in the art and is known as a "take-apart" design. Additionally, bellows 141, bellows top plate 143, and piston top plate 182 define a bellows chamber 198.

A bumper 181 extends into bellows chamber 198 and is rigidly attached to a bumper mounting plate 186 by means generally well known in the art. Bumper mounting plate 186 is in turn mounted on piston top plate 182 by a fastener 184. Bumper 181 is formed from rubber, plastic or other compliant material and extends upwardly from the top surface of bumper mounting plate 186. Additionally, bumper 181 serves as a cushion between piston top plate 182 and the underside of bellows top plate 143 in order to prevent the plates from damaging one another in the event that the piston top plate and the underside of the bellows top plate contact one another during operation of the vehicle. Piston top plate 182 is formed with a pair of openings 185, which allow a volume $V_1$ of the piston chamber 199 and a volume $V_2$ of the bellows chamber 198 to communicate with one another. More specifically, openings 185 allow fluid or air to pass between piston chamber 199 and bellows chamber 198 during operation of the vehicle. Openings 185, piston chamber 199 and bellows chamber 198 require custom design and manufacture for different applications to achieve optimal damping. As a result, prior art piston 142 is expensive to design and manufacture for each specific axle/suspension system application.

Although prior art air spring 124 does provide sufficient damping characteristics, the manufacturing process of the prior art spring with damping characteristics requires a custom designed piston 142 thus undesirably increasing design and manufacturing costs. Moreover, the "take-apart" design of prior art air spring 124 with damping characteristics, may potentially limit rebound travel and jounce travel and may potentially exacerbate fold in issues in "low pressure" or "no air" situations. The air spring of the present invention overcomes the problems associated with prior art air springs 24, 124, by providing a method for converting an existing non-damping air spring having a "molded-in" or "take-apart" end closure into an air spring with damping features, thus minimizing both design and manufacturing costs as well as production costs. The air spring of the present invention will now be described in detail below.

Figure 5:
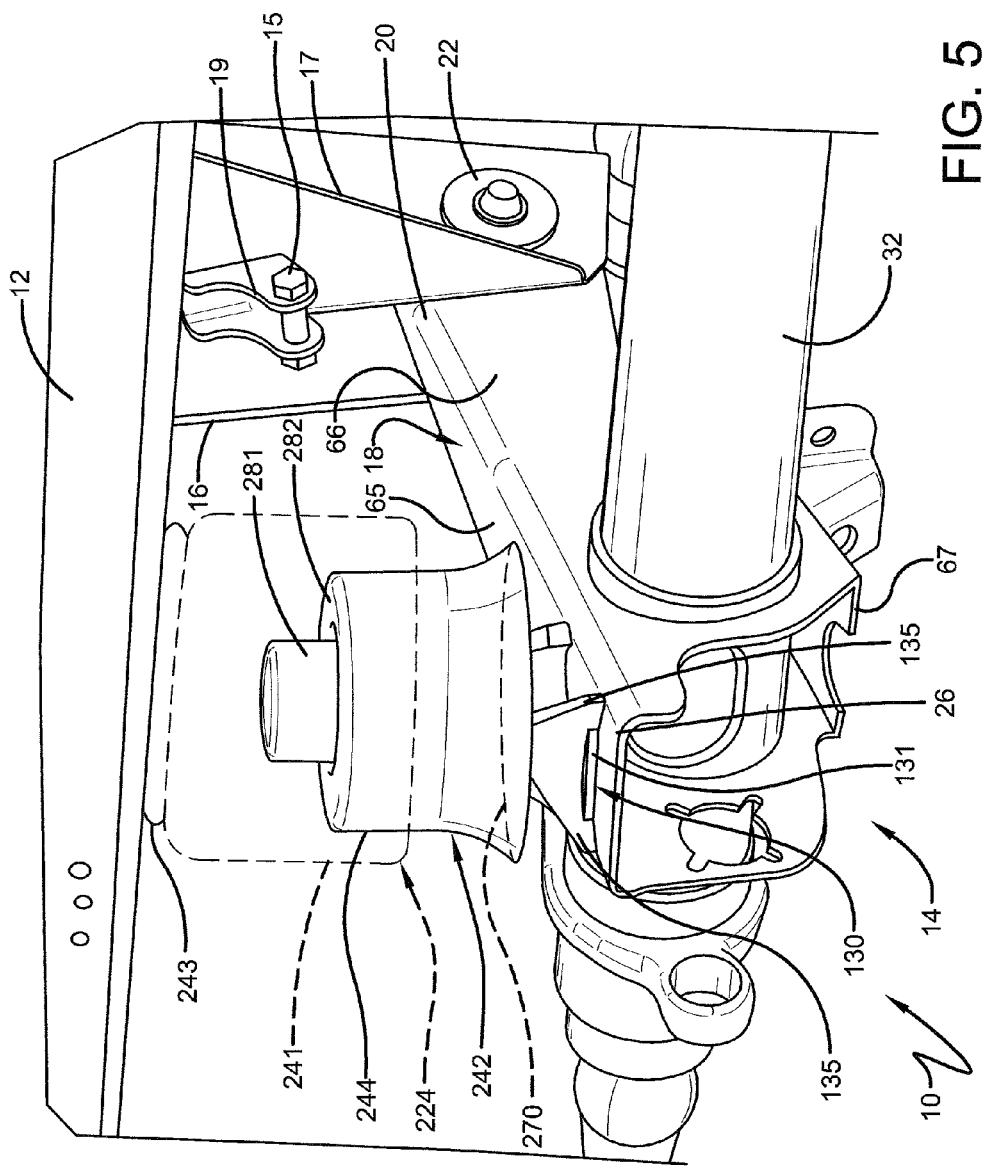
FIG. 5 is a fragmentary rear perspective view of a prior art axle/suspension system incorporating a first exemplary embodiment air spring of the present invention with a portion of the air spring shown in phantom lines.

Turning to FIG. 5, a first exemplary embodiment air spring 224 of the present invention is shown mounted on a prior art axle/suspension system 10, described in detail above. First exemplary embodiment air spring 224 is similar to prior art air spring 24 with respect to its structure, but with some differences that include modification to provide damping characteristics by including a circular disc 270, an opening 274 (FIG. 6), and an opening 275 (FIG. 6), as will be described in detail below.

Figure 6:
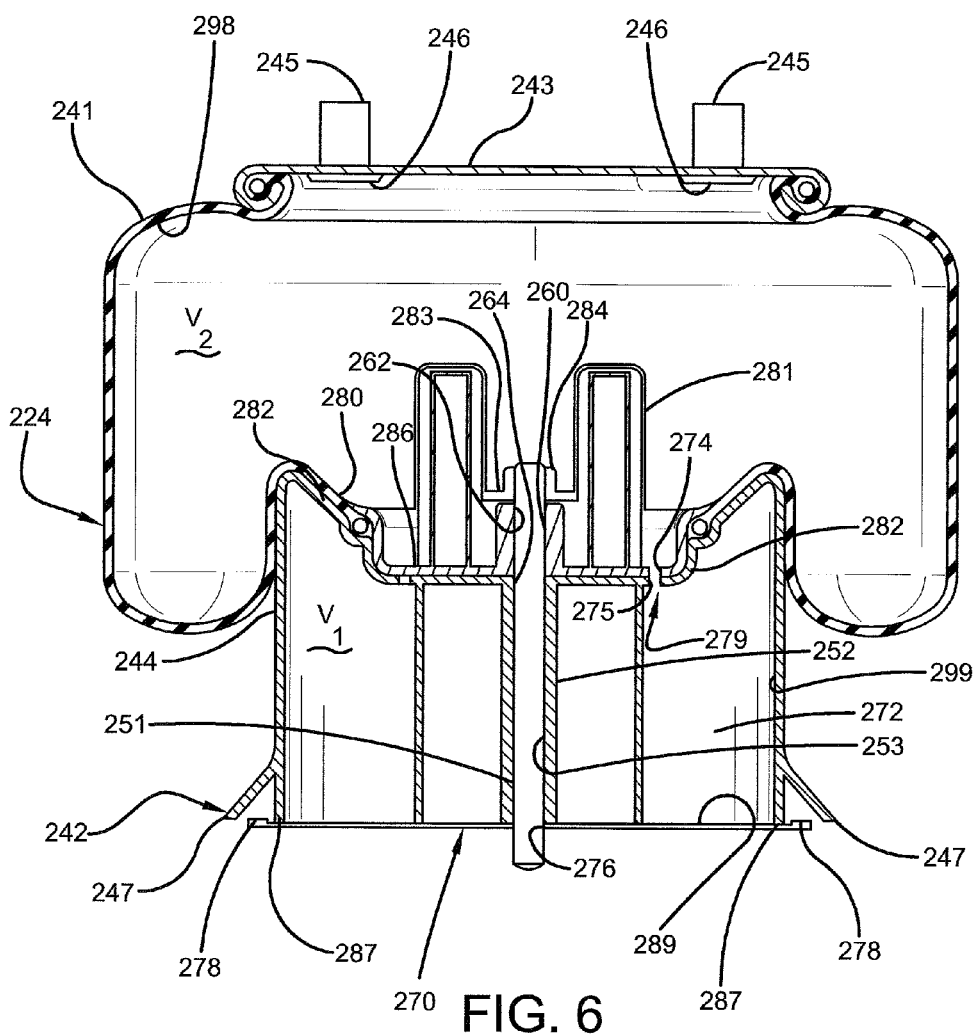
FIG. 6 is a fragmentary elevation view, in section, of the first exemplary embodiment air spring of the present invention shown in FIG. 5, showing the bellows mounted on a piston of the air spring and showing a disc mounted on the underside of the piston, and also showing an opening formed between the piston chamber and the bellows chamber to provide fluid communication between the piston chamber and the bellows chamber of the air spring.
Figure 7:
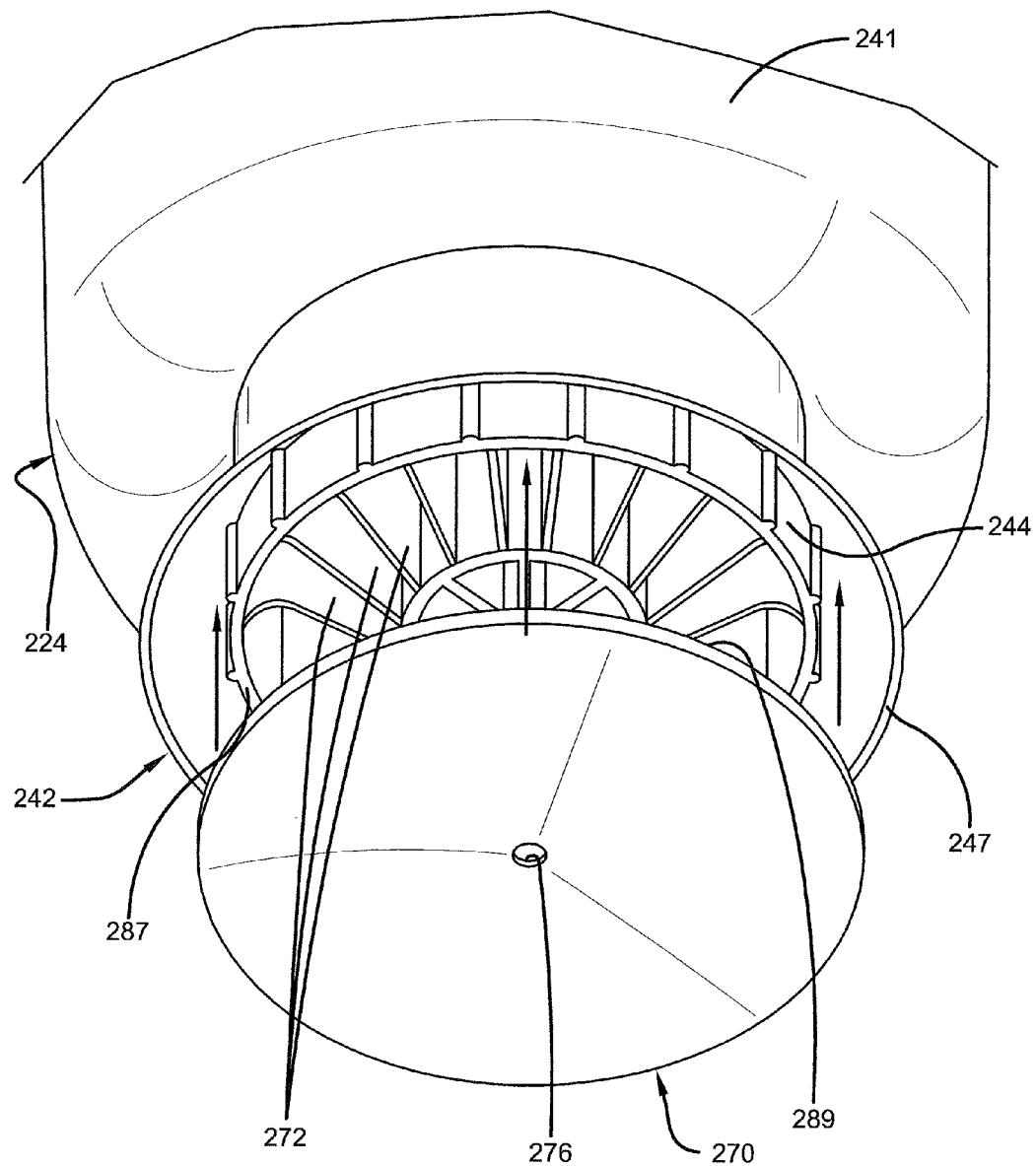
FIG. 7 is a fragmentary bottom perspective view of the first exemplary embodiment air spring of the present invention shown in FIG. 5, showing the disc being installed on the bottom of the air spring piston.

With additional reference to FIGS. 6 and 7, first exemplary embodiment air spring 224 generally includes a bellows 241, a bellows top plate 243, and a piston 242. Bellows top plate 243 includes a pair of fasteners 245, each formed with an opening 246. Fasteners 245 are utilized to mount air spring 224 to an air spring plate (not shown), that in turn is mounted to main member 12 (FIG. 5). Piston 242 is generally cylindrical-shaped and includes a sidewall 244, a flared portion 247, and a top plate 282.

With particular reference to FIG. 6, a bumper 281 is disposed on a top surface of a retaining plate 286 (FIG. 6). Retaining plate 286, bumper 281 and piston top plate 282 are each formed with an aligned opening 260, 262, and 264, respectively. A fastener 251 is disposed through piston top plate opening 264, retaining plate opening 260, and bumper opening 262. A washer 283 and a nut 284 are disposed on fastener 251 to mount bumper 281 and retaining plate 286 on the top surface of piston top plate 282. Retaining plate 286 includes a flared end 280 that is molded into the lower end of bellows 241, which holds the bellows in place on piston 242 and forms an airtight seal between the bellows and the piston. Thus, first exemplary embodiment air spring 224 is known as a "molded-in" air spring design. It should be understood that flared end 280 of retaining plate 286 could also be separate from the lower end of bellows 241, whereby the flared end would capture and hold the lower end of the bellows in place on piston 242 to form an airtight seal between the bellows and the piston, without changing the overall concept or operation of the of the present invention. Bellows 241, retaining plate 286, and bellows top plate 243 generally define a bellows chamber 298 having an interior volume $V_2$ at standard ride height. Bellows chamber 298 preferably has a volume of from about 305 in.$^3$ to about 3000 in.$^3$. More preferably, bellows chamber 298 has a volume of about 485 in.$^3$. Bumper 281 is formed from rubber, plastic or other compliant material and extends generally upwardly from retaining plate 286 mounted on piston top plate 282. Bumper 281 serves as a cushion between piston top plate 282 and the underside of bellows top plate 243 in order to prevent the plates from damaging one another during operation of the vehicle.

First exemplary embodiment air spring 224 is formed with an upwardly extending central hub 252 attached to sidewall 244 in a well-known manner. Central hub 252 is formed with an opening 253 that is continuous with piston top plate opening 264. A plurality of ribs 272 (FIG. 7) extend radially between central hub 252 and sidewall 244 to provide structural support to air spring 224 of the present invention.

In accordance with one of the primary features of the present invention, as more clearly shown in FIGS. 6 and 7, generally circular disc 270 is attached or mated to the bottom of piston 242 of first exemplary embodiment air spring 224 of the present invention. Circular disc 270 is formed with an opening 276 that aligns with opening 253 of piston central hub 252. Fastener 251 extends downwardly through piston central hub opening 253, through disc opening 276, through an opening (not shown) formed in beam mounting pedestal 130, and through an opening (not shown) formed in beam rear end top plate 65. A nut (not shown) is threaded onto the bottom end of fastener 251 to sealingly attach circular disc 270 to first exemplary embodiment air spring 224, and also attaches piston 242 of air spring 224 to beam 18. Once attached, a top surface 289 of circular disc 270 is mated to a lower surface 287 of sidewall 244 of piston 242 of first exemplary embodiment air spring 224 to provide an airtight seal between circular disc 270 and piston 242. Circular disc 270 is formed with a continuous raised lip 278 on its top surface along the periphery of the disc, with the lip being disposed generally between flared portion 247 and sidewall 244 of piston 242 when circular disc 270 is mated to the piston. Optionally, the attachment of circular disc 270 to piston 242 may be supplemented by additional attachment means such as welding, soldering, crimping, friction welding, an O-ring, a gasket, adhesive or the like. Alternatively, the attachment of circular disc 270 to piston 242 may be accomplished via means other than fastener 251, such as other types of fasteners, welding, soldering, crimping, friction welding, adhesives and the like, without changing the overall concept or operation of the present invention. Circular disc 270 may be composed of metal, plastic, and/or composite material, or other materials known to those skilled in the art, without changing the overall concept or operation of the present invention. Circular disc 270 may optionally include a groove (not shown) formed in top surface 289 disposed circumferentially around the disc, and configured to mate with a downwardly extending hub of the piston in order to reinforce the connection of the disc to the bottom of piston 242. An O-ring or gasket material could optionally be disposed in the groove to ensure an airtight fit of circular disc 270 to piston 242.

With continued reference to FIGS. 5-7, once circular disc 270 is attached to piston 242, top plate 282, sidewall 244, and the disc, define a piston chamber 299 having an interior volume $V_1$. Piston chamber 299 is generally able to withstand the required burst pressure of the axle/suspension system 10 during vehicle operation. Piston chamber 299 preferably has a volume of from about 105 in.$^3$ to about 550 in.$^3$. More preferably, piston chamber 299 has a volume of about 240 in.$^3$.

In accordance with another of the primary features of the present invention, opening 274 is formed in retaining plate 286 and aligned opening 275 is formed in top plate 282 of piston 242. More particularly, aligned openings 274, 275 are disposed generally adjacent to bumper 281. Openings 274, 275 are generally cylindrical-shaped but may include other shapes including oval, elliptical or other shapes without changing the overall concept or operation of the present invention. Aligned openings 274,275 together form a continuous opening 279 that allows piston chamber 299 to fluidly communicate with bellows chamber 298. Alternatively, openings 274, 275 may include a spring pin (not shown), or a self-tapping screw with an integral opening, or other similar conduit that provides communication of fluid or air between piston chamber 299 and bellows chamber 298 during operation of the vehicle. In this manner, damping characteristics are provided to first exemplary embodiment air spring 224 of the present invention. Opening 279 preferably has a cross sectional area of from about 0.009 in.$^2$ to about 0.13 in.$^2$. More preferably, opening 279 has a cross sectional area of about 0.06 in.$^2$.

It is contemplated that the ratio of the cross-sectional area of opening 279 measured in in.$^2$ to the volume of piston chamber 299 measured in in.$^3$ to the volume of bellows chamber 298 measured in in.$^3$ is in the range of ratios of from about 1:403:2,346 to about 1:61,111:333,333, This is an inclusive range that could be alternatively expressed as 1:403-61,111:2,346-333,333, including any combination of ratios in between, and, for example, would necessarily include the following ratios 1:403:333,333 and 1:61,111:2, 346.

More specifically, when axle 32 of axle/suspension system 10 experiences a jounce event, such as when the vehicle wheels encounter a curb or a raised bump in the road, the axle moves vertically upwardly toward the vehicle chassis. In such a jounce event, bellows chamber 298 is compressed by axle/suspension system 10 as the wheels of the vehicle travel over the curb or the raised bump in the road. The compression of air spring bellows chamber 298 causes the internal pressure of the bellows chamber to increase. Therefore, a pressure differential is created between bellows chamber 298 and piston chamber 299. This pressure differential causes air to flow from bellows chamber 298, through continuous opening 279 and into piston chamber 299. The flow of air between bellows chamber 298 into piston chamber 299 through opening 279 causes damping to occur. As an additional result of the airflow through continuous opening 279, the pressure differential between bellows chamber 298 and piston chamber 299 is reduced. Air continues to flow through opening 279 until the pressures of piston chamber 299 and bellows chamber 298 have equalized.

Conversely, when axle 32 of axle/suspension system 10 experiences a rebound event, such as when the vehicle wheels encounter a large hole or depression in the road, the axle moves vertically downwardly away from the vehicle chassis. In such a rebound event, bellows chamber 298 is expanded by axle/suspension system 10 as the wheels of the vehicle travel into the hole or depression in the road. The expansion of air spring bellows chamber 298 causes the internal pressure of the bellows chamber to decrease. As a result, a pressure differential is created between bellows chamber 298 and piston chamber 299. This pressure differential causes air to flow from piston chamber 299, through continuous opening 279 and into bellows chamber 298. The flow of air through opening 279 causes damping to occur. As an additional result of the airflow through opening 279, the pressure differential between bellows chamber 298 and piston chamber 299 is reduced. Air will continue to flow through continuous opening 279 until the pressures of piston chamber 299 and bellows chamber 298 have equalized. When little or no suspension movement has occurred over a period of several seconds, the pressure of bellows chamber 298 and piston chamber 299 can be considered equal.

As a result of attaching circular disc 270 to piston 242, and providing opening 274 in retaining plate 286 and opening 275 in top plate 282 of the piston, collectively, continuous opening 279, a non-damping air spring, such as prior art air spring 24 (FIG. 1), may be converted to an air spring that provides damping characteristics such as first exemplary embodiment air spring 224 of the present invention. In this manner, axle/suspension system 10 does not require a shock absorber to provide damping to the axle/suspension system, thus reducing the weight of the axle/suspension system. Further, first exemplary embodiment air spring 224 of the present invention provides damping characteristics without requiring a custom design and manufacturing process, as an existing designed and manufactured piston 242 is utilized, resulting in a desirable decrease in design and manufacturing costs when compared to the prior art air spring with damping characteristics, such as prior art air spring 124 (FIG. 4). As a result, air spring 224 of the present invention converts non-damping air springs, such as prior art air spring 24, to an air spring with damping characteristics, in an economical manner without an undesirable increase in manufacturing and design costs, and also avoiding the potential deficiencies of the "take-apart" air spring design.

It should be understood that first exemplary embodiment air spring 224 could also be utilized in conjunction with a "take-apart" air spring design having an open bottom, without changing the overall concept or operation of the present invention. In such an application, continuous opening 279 is formed through the piston top plate, as the "take-apart" air spring design typically does not include a retaining plate. Disc 270 is attached to the open bottom of the piston of the "take-apart" air spring design, and as a result, allows a non-damping "take-apart" air spring design to be converted to a damping "take-apart" air spring design that includes damping characteristics similar to the "molded-in" air spring design described above.

Figure 8:
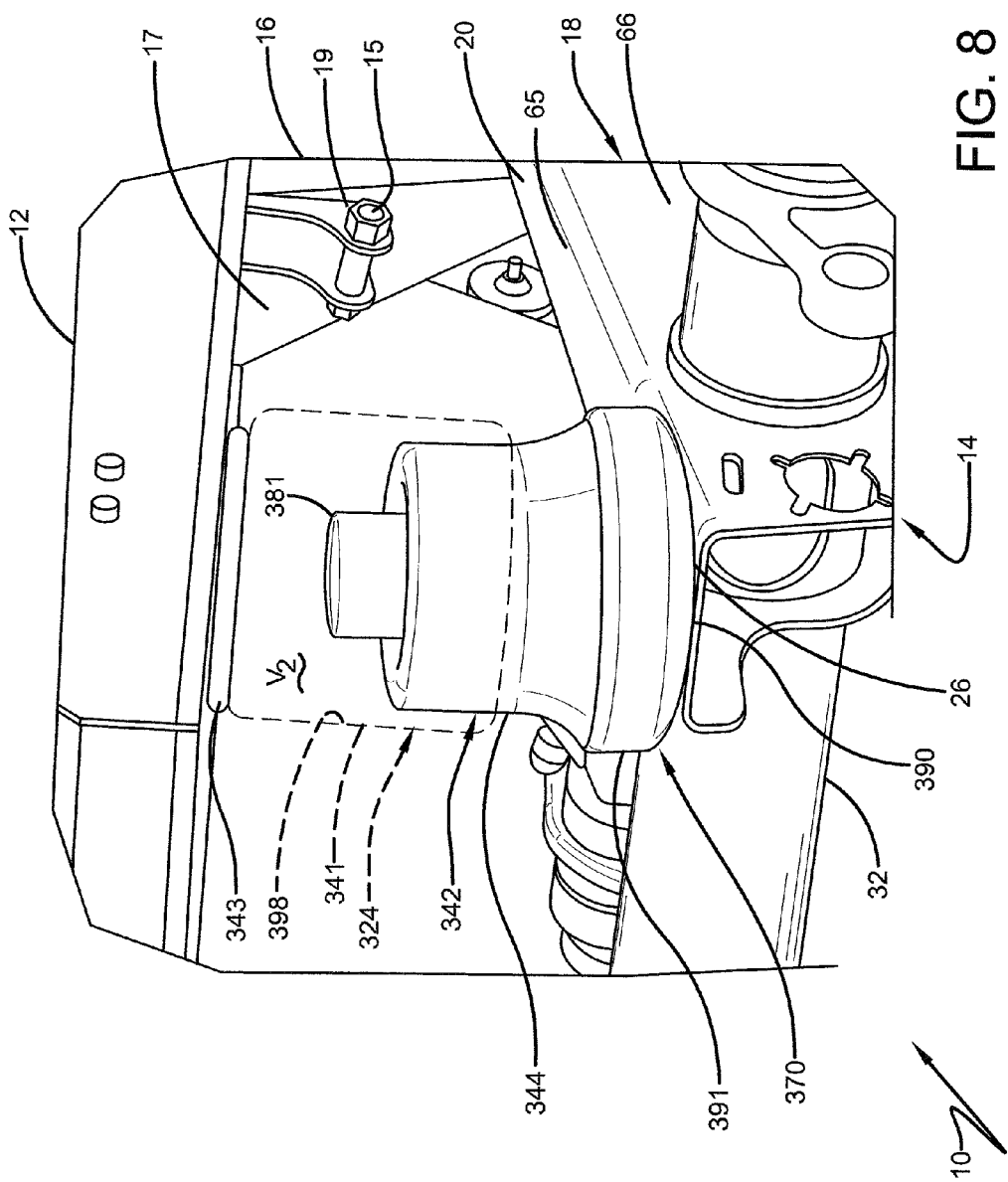
FIG. 8 is a fragmentary rear perspective view of a prior art axle/suspension system incorporating a second exemplary embodiment air spring of the present invention, showing a disc integrated with a beam mounting pedestal and attached to the bottom of a piston to create a piston chamber, with the integrated disc also attaching the piston of the second exemplary embodiment air spring to a beam of the axle/suspension system with a portion of the air spring shown in phantom lines.

Turning to FIG. 8, a second exemplary embodiment air spring 324 of the present invention, is shown mounted on prior art axle/suspension system 10, described in detail above.

Second exemplary embodiment air spring 324 is similar to prior art air spring 24 with respect to its structure, but with some differences that include modification to provide integration of the beam mounting pedestal and damping characteristics by including a disc 370, an opening 374 and an opening 375, as will be described below. Second exemplary embodiment air spring 324 generally includes a bellows 341, a bellows top plate 343, and a piston 342. Top plate 343 includes a pair of fasteners 345, each formed with an opening 346. Fasteners 345 are utilized to mount air spring 324 to an air spring plate (not shown) that in turn is mounted to main member 12 (FIG. 8). Piston 342 is generally cylindrical-shaped and includes a sidewall 344, a flared portion 347, and a top plate 382.

Figure 9:
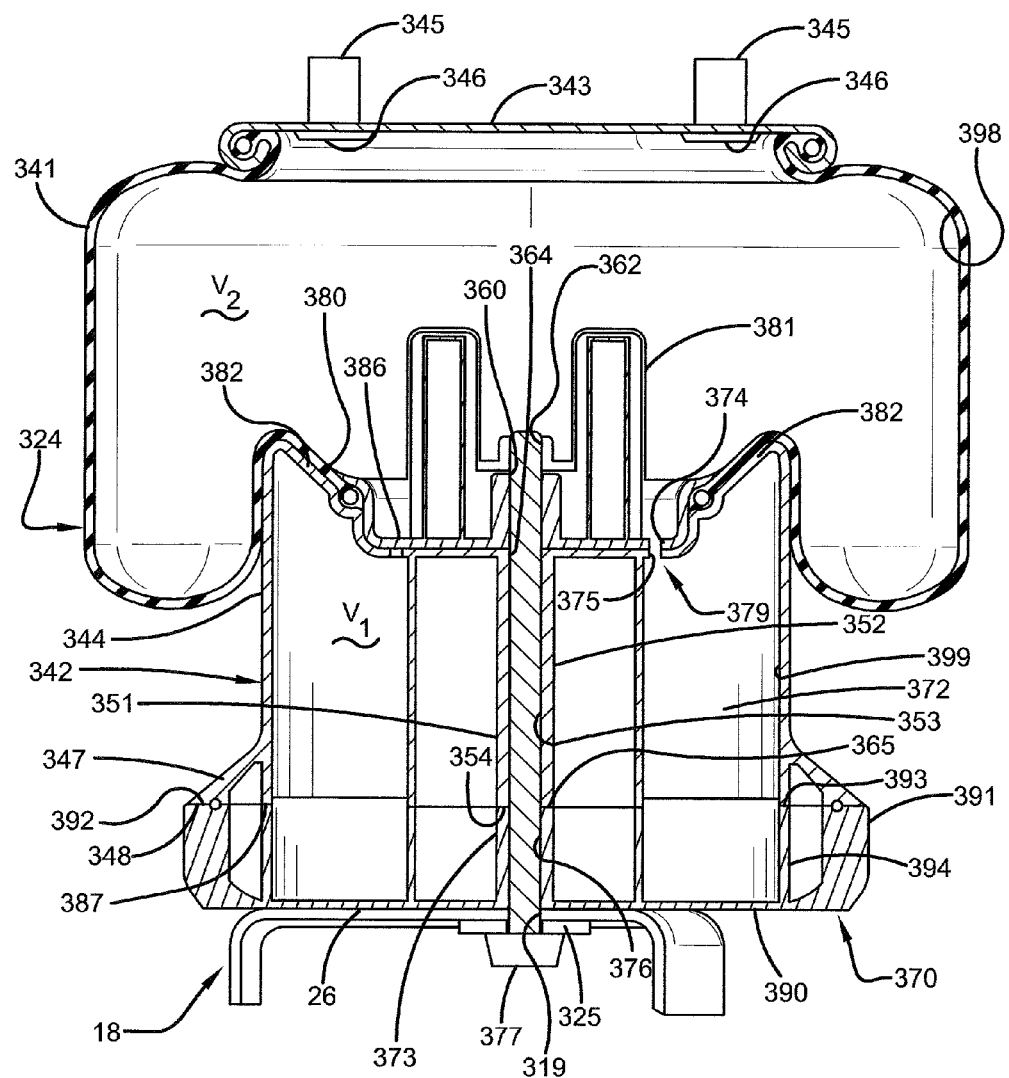
FIG. 9 is a fragmentary elevation view, in section, of the piston shown in FIG. 8.

With additional reference to FIG. 9, a bumper 381 is disposed on a top surface of a retaining plate 386. Retaining plate 386, bumper 381, and piston top plate 382 are each formed with aligned openings 360, 362, and 364, respectively. A fastener 351 is disposed through piston top plate opening 364, retaining plate opening 360, and bumper opening 362. A washer (not shown) and a nut (not shown) are threadably disposed on fastener 351 to mount bumper 381 and retaining plate 386 on the top surface of piston top plate 382. Retaining plate 386 includes a flared end 380 that is molded into the lower end of bellows 341, which holds the bellows in place on piston 342 and forms an airtight seal between the bellows and the piston. Thus, second exemplary embodiment air spring 324 is known as a "molded-in" air spring design. It should be understood that flared end 380 of retaining plate 386 could also be separate from the lower end of the bellows 341, whereby the flared end would capture and hold the lower end of the bellows in place on piston 342 to form an airtight seal between the bellows and the piston, without changing the overall concept or operation of the present invention. Bellows 341, retaining plate 386, and the bellows top plate (not shown) generally define a bellows chamber 398 having an interior volume $V_2$ at standard ride height. Bellows chamber 398 preferably has a volume of from about 305 in.$^3$ to about 3000 in.$^3$. More preferably, bellows chamber 398 has a volume of about 485 in.$^3$. Bumper 381 is formed from rubber, plastic or other compliant material and extends generally upwardly from retaining plate 386 mounted on piston top plate 382. Bumper 381 serves as a cushion between piston top plate 382 and the underside of the bellows top plate 343 in order to prevent the plates from damaging one another during operation of the vehicle.

Second exemplary embodiment air spring 324 is formed with an upwardly extending central hub 352 attached to sidewall 344 in a well-known manner. Central hub 352 is formed with an opening 353 that is continuous with top plate opening 364. A plurality of ribs 372 extend radially between central hub 352 and sidewalls 344 to provide structural support to second exemplary embodiment air spring 324 of the present invention.

In accordance with one of the primary features of the present invention, generally cup-shaped disc 370 is attached to the bottom of piston 342 of second exemplary embodiment air spring 324 of the present invention. Cup-shaped disc 370 includes a disc base 390 and a vertical sidewall 391. Vertical sidewall 391 extends upwardly from disc base 390 to facilitate a sealing attachment to piston 342, as will be described below.

More specifically, disc base 390 is formed with an opening 376 that aligns with opening 353 of piston central hub 352. Fastener 351 extends downwardly through piston hub central opening 353, through disc opening 376, and through an opening 319 formed in beam rear end 26. A washer 325 and a nut 377 are threadably engaged with the bottom end of fastener 351 to sealingly attach cup-shaped disc 370 to first exemplary embodiment air spring 324, and attach the piston of the air spring to the beam. Therefore, cup-shaped disc 370 is attached to beam 18 without the use of a beam mounting pedestal, such as beam mounting pedestal 130 (FIG. 2), because cup-shaped disc 370 integrates the beam mounting pedestal into its structure. Once attached, an upper surface 393 of an interior vertical wall 394 of disc base 390 of cup-shaped disc 370 mates with a lower surface 387 of sidewall 344, and a top edge 392 of disc vertical sidewall 391 mates with a lower surface 348 of flared portion 347 of piston 342 to provide an airtight sealing engagement with the piston. Additionally, an upper surface 365 of a central portion 373 of cup-shaped disc 370 mates with a lower surface 354 of central hub 352 to provide a sealing engagement with piston 342. In this manner, cup-shaped disc 370, piston top plate 382, and piston sidewall 344 define a piston chamber 399 having an interior volume $V_1$. Piston chamber 399 generally is able to withstand the required burst pressure of the axle/suspension system 10 (FIG. 5) during vehicle operation. Piston chamber 399 preferably has a volume of from about 105 in.$^3$ to about 550 in.$^3$. More preferably, piston chamber 399 has a volume of about 240 in.$^3$. It is important to note that cup-shaped disc 370 may be attached at different locations on piston 342 to vary the volume $V_1$ based on the specific application of the heavy-duty vehicle (not shown) to facilitate optimization of damping characteristics of air spring 324 of the present invention. Optionally, the attachment of cup-shaped disc 370 to piston 342 may be supplemented by additional attachment means such as welding, soldering, crimping, friction welding, an O-ring, a gasket, adhesive or the like. Alternatively, the attachment of cup-shaped disc 370 to piston 342 may be accomplished via means other than fastener 351, such as other types of fasteners, welding, soldering, crimping, friction welding, adhesives and the like, without changing the overall concept or operation of the present invention. In addition, cup-shaped disc 370 may be composed of metal, plastic, and/or composite material, or other materials known to those skilled in the art, without changing the overall concept or operation of the present invention.

In accordance with another of the primary features of the present invention, opening 374 is formed in retaining plate 386 and aligned opening 375 is formed in top plate 382 of piston 342. More particularly, aligned openings 374,375 are adjacent to bumper 381. Openings 374,375 are generally cylindrical-shaped but may include other shapes including oval, elliptical or other shapes without changing the overall concept or operation of the present art. Aligned openings 374,375 together form a continuous opening 379 that allows piston chamber 399 to fluidly communicate with bellows chamber 398. Alternatively, openings 374,375 may include a spring pin (not shown), or a self-tapping screw with an integral opening, or other similar conduit that provides communication of fluid or air between piston chamber 399 and bellows chamber 398 during operation of the vehicle. In this manner, damping characteristics are provided to second exemplary embodiment air spring 324 of the present invention. Continuous opening 379 preferably has a cross sectional area of from about 0.009 in.$^2$ to about 0.13 in.$^2$. More preferably, continuous opening 379 has a cross sectional area of about 0.06 in.$^2$.

It is contemplated that the ratio of the cross-sectional area of opening 379 measured in in.$^2$ to the volume of piston chamber 399 measured in in.$^3$ to the volume of bellows chamber 398 measured in in.$^3$ is in the range of ratios of from about 1:403:2,346 to about 1:61,111:333,333. This is an inclusive range that could be alternatively expressed as 1:403-61,111:2,346-333,333, including any combination of ratios in between, and, for example, would necessarily include the following ratios 1:403:333,333 and 1:61,111:2,346.

As shown in FIGS. 8-9, with the attachment of cup-shaped disc 370 to piston 342, and the disc to beam 18, a damping feature is provided to second exemplary embodiment air spring 324 of the present invention, which doubles as a mount for the air spring to the beam. More specifically, when axle 32 of axle/suspension system 10 experiences a jounce event, such as when the vehicle wheels encounter a curb or a raised bump in the road, the axle moves vertically upwardly toward the vehicle chassis. In such a jounce event, bellows chamber 398 is compressed by axle/suspension system 10 as the wheels of the vehicle travel over the curb or the raised bump in the road. The compression of air spring bellows chamber 398 causes the internal pressure of the bellows chamber to increase. Therefore, a pressure differential is created between bellows chamber 398 and piston chamber 399. This pressure differential causes air to flow from bellows chamber 398, through continuous opening 379 and into piston chamber 399. The flow of air between bellows chamber 398 into piston chamber 399 through continuous opening 379 causes damping to occur. As an additional result of the airflow through continuous opening 379, the pressure differential between bellows chamber 398 and piston chamber 399 is reduced. Air continues to flow through continuous opening 379 until the pressures of piston chamber 399 and bellows chamber 398 have equalized.

Conversely, when axle 32 of axle/suspension system 10 experiences a rebound event, such as when the vehicle wheels encounter a large hole or depression in the road, the axle moves vertically downwardly away from the vehicle chassis. In such a rebound event, bellows chamber 398 is expanded by axle/suspension system 10 as the wheels of the vehicle travel into the hole or depression in the road. The expansion of air spring bellows chamber 398 causes the internal pressure of the bellows chamber to decrease. As a result, a pressure differential is created between bellows chamber 398 and piston chamber 399. This pressure differential causes air to flow from piston chamber 399, through continuous opening 379 and into bellows chamber 398. The flow of air through continuous opening 379 causes damping to occur. As an additional result of the airflow through continuous opening 379, the pressure differential between bellows chamber 398 and piston chamber 399 is reduced. Air will continue to flow through continuous opening 379 until the pressures of piston chamber 399 and bellows chamber 398 have equalized. When little or no suspension movement has occurred over a period of several seconds the pressure of bellows chamber 398 and piston chamber 399 can be considered equal.

As a result of attaching circular disc 370 to piston 342, and providing opening 374 in retaining plate 386 and opening 375 in top plate 382 of the piston, collectively, continuous opening 379, a non-damping air spring, such as prior art air spring 24 (FIG. 1), may be converted to an air spring that provides damping characteristics such as second exemplary embodiment air spring 324 of the present invention. In this manner, axle/suspension system 10 does not require shock absorber 40 (FIG. 1) to provide damping to the axle/suspension system, thus reducing the weight of the axle/suspension system. Further, second exemplary embodiment air spring 324 of the present invention provides damping characteristics without requiring a custom design and manufacturing process, as an existing designed and manufactured piston 342 is utilized, resulting in a desirable decrease in design and manufacturing costs when compared to prior art air springs with damping characteristics such as prior art air spring 124 (FIG. 4). Moreover, second exemplary embodiment air spring 324 with cup-shaped disc 370 does not require a discrete beam mounting pedestal, thus desirably reducing weight and desirably reducing the amount of time needed to install the air spring of the present invention. As a result, air spring 324 of the present invention converts non-damping air springs, such as prior art air spring 24, to an air spring with damping characteristics, in an economical manner without an undesirable increase in manufacturing and design costs, and also avoiding the potential deficiencies of the "take-apart" air spring design.

It should be understood that second exemplary embodiment air spring 324 could also be utilized in conjunction with a "take-apart" air spring design having an open bottom, without changing the overall concept or operation of the present invention. In such an application, continuous opening 379 is formed only through the piston top plate, as the "take-apart" air spring design typically does not include a retaining plate. Disc 370 is attached to the open bottom of the piston of the "take-apart" air spring design, and as a result, allows a non-damping "take-apart" air spring design to be converted to a damping "take-apart" air spring design that has damping characteristics similar to the "molded-in" air spring design described above.

Figure 10:
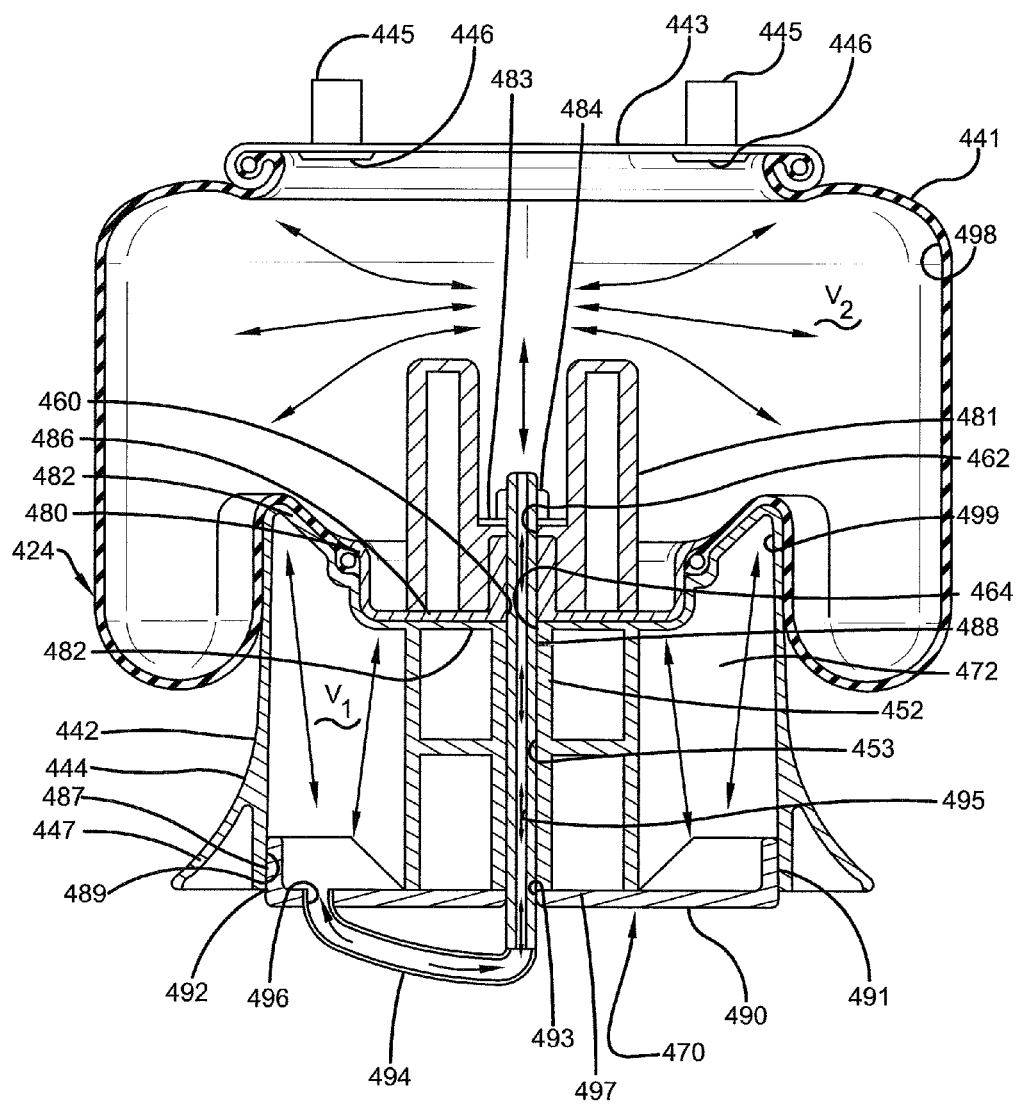
FIG. 10 is a fragmentary elevation view of a third exemplary embodiment air spring of the present invention, showing a bellows mounted on a piston of the air spring, and showing a disc mounted on the bottom of the piston to create a piston chamber, and further showing fluid communication between the bellows chamber and the piston chamber via a hollow threaded rod and a conduit.

Turning to FIG. 10, a third exemplary embodiment air spring 424 of the present invention is shown. Third exemplary embodiment 424 is utilized on prior art axle/suspension system 10, described in detail above. Third exemplary embodiment air spring 424 is similar to prior art air spring 24 with respect to its structure, but with some differences that include modification to provide damping characteristics by including a disc 470 and a threaded rod 488 formed with an opening 495, as will be described below. Third exemplary embodiment air spring 424 generally includes a bellows 441, a bellows top plate 443, and a piston 442. Bellows top plate 443 is formed with a pair of openings 446 through which a pair of fasteners 445 are disposed. Fasteners 445 are utilized to mount air spring 424 to an air spring plate (not shown), that in turn is mounted to the main member (not shown) of the axle/suspension system (not shown). Piston 442 is generally cylindrical-shaped and includes a sidewall 444, a flared portion 447, and a top plate 482, as will be described below.

A bumper 481 is disposed on a top surface of a retaining plate 486. Retaining plate 486, bumper 481, and piston top plate 482 are each formed with an aligned opening 460, 462, and 464. Threaded rod 488 extends upwardly through piston top plate opening 464, retaining plate opening 460, and bumper opening 462. A washer 483 and a nut 484 are disposed on threaded rod 488 to mount bumper 481 and retaining plate 486 on the top surface of piston top plate 482. Retaining plate 486 includes a flared end 480 that captures and holds the lower end of bellows 441 in place on piston 442 to form an airtight seal between the bellows and the piston. Thus, third exemplary embodiment air spring 424 is known as a "molded-in" air spring design. It should be understood that retaining plate 486 could also be integrally molded into the lower end of bellows 441, without changing the overall concept or operation of the present invention. Bellows 441, retaining plate 486, and bellows top plate 443 generally define a bellows chamber 498 having an interior volume $V_2$ at standard ride height. Bellows chamber 498 preferably has a volume of from about 305 in.$^3$ to about 3000 in.$^3$. More preferably, bellows chamber 498 has a volume of about 485 in.$^3$. Bumper 481 is formed from rubber, plastic or other compliant material and extends generally upwardly from retaining plate 486 mounted on piston top plate 482. Bumper 481 serves as a cushion between piston top plate 482 and the underside of bellows top plate 443 to prevent the plates from damaging one another during operation of the vehicle.

Third exemplary embodiment air spring 424 is formed with an upwardly extending central hub 452 attached to sidewall 444 in a well-known manner. Central hub 452 includes an opening 453 that is continuous with top plate opening 464 and through which threaded rod 488 is disposed, as will be described below. A plurality of ribs 472 extend radially between central hub 452 and sidewall 444 to provide structural support to third exemplary embodiment air spring 424.

Figure 11:
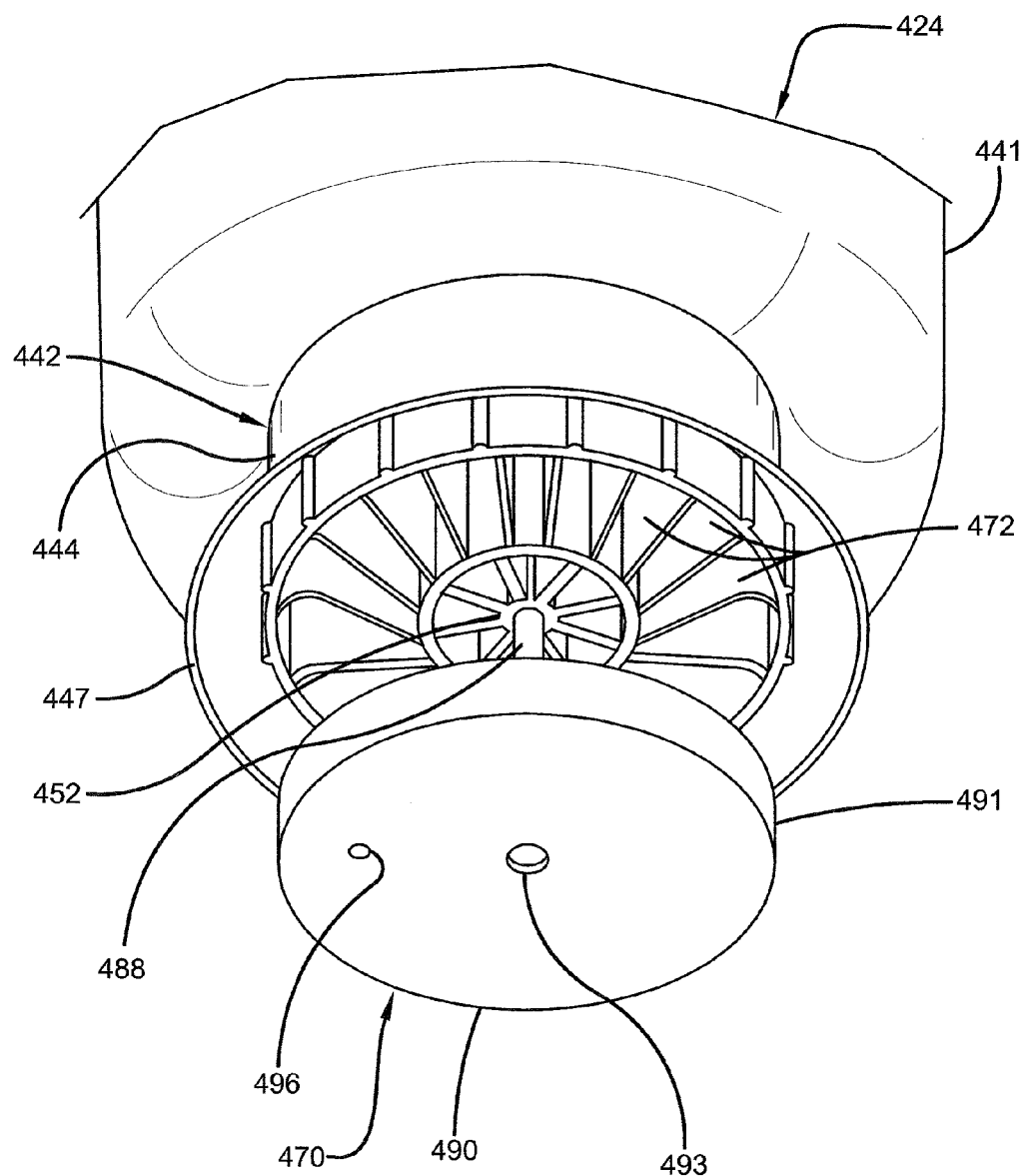
FIG. 11 is a fragmentary bottom perspective view of the third exemplary embodiment air spring shown in FIG. 10, showing the disc being installed on the bottom of the air spring.

With continued reference to FIGS. 10-11, and in accordance with one of the primary features of the present invention, generally circular disc 470 is attached to the bottom of piston 442 of third exemplary embodiment air spring 424 of the present invention. More specifically, circular disc 470 includes a base 490 and a vertical sidewall 491 that extends vertically upwardly from the base. Base 490 is formed with a central opening 493 that aligns with opening 453 of piston central hub 452. Base 490 is also formed with a second opening 496 that is radially spaced from first opening 493. It should be understood that second opening 496 could be formed in base 490 at any accessible location without changing the overall concept or operation of the present invention. Threaded rod 488 extends downwardly through piston central hub opening 453, through disc opening 493, through an opening (not shown) formed in the beam mounting pedestal (not shown), and through an opening formed in the top wall of beam rear end (not shown). A nut (not shown) is threaded onto the bottom end of the threaded rod to sealingly attach circular disc 470 to third exemplary embodiment air spring 424, and also attaches the piston of the air spring to the beam of the axle/suspension system (not shown). Once attached, disc vertical sidewall 491 sealingly mates with piston sidewall 444, as will be discussed below.

More particularly, vertical sidewall 491 of circular disc 470 matingly engages sidewall 444 of piston 442 to provide a sealing engagement of the disc to the piston. More specifically, an outer surface 492 of vertical sidewall 491 of circular disc 470 mates with an inner surface 489 of lower portion 487 of sidewall 444 to form an airtight seal. Optionally, the attachment of circular disc 470 to piston 442 may be supplemented by additional attachment means such as welding, soldering, crimping, friction welding, an O-ring, a gasket, adhesive or the like. Alternatively, the attachment of circular disc 470 to piston 442 may be accomplished via alternative means, such as fasteners, welding, soldering, crimping, friction welding, adhesives and the like, without changing the overall concept or operation of the present invention. Circular disc 470 may be composed of metal, plastic, and/or composite material or other materials known to those skilled in the art, without changing the overall concept or operation of the present invention. As a result of the sealing engagement of circular disc 470 to the bottom of piston 442, the disc, piston top plate 482, and piston sidewall 444 define a sealed piston chamber 499 having an interior volume $V_1$. Piston chamber 499 generally is able to withstand the required burst pressure of the axle/suspension system (not shown) during vehicle operation. Piston chamber 499 preferably has a volume of from about 105 in.$^3$ to about 550 in.$^3$. More preferably, piston chamber 499 has a volume of about 240 in.$^3$.

In accordance with another of the primary features of the present invention, threaded rod 488 is formed with opening 495 that extends through the entire length of the threaded rod. A conduit 494 having a continuous opening is in fluid communication with the bottom end of threaded rod opening 495, and is disposed through and attached, by any suitable means, to opening 496 formed in circular disc 470. Conduit 494 and threaded rod opening 495 provide fluid communication between bellows chamber 498 and piston chamber 499. The opening in conduit 494 and threaded rod opening 495 each preferably have a cross sectional area of from about 0.009 in.$^2$ to about 0.13 in.$^2$. More preferably, the opening in conduit 494 and threaded rod opening 495 each have a cross sectional area of about 0.06 in.$^2$.

It is contemplated that the ratio of the cross-sectional area of the opening in conduit 494 and threaded rod opening 495 measured in in.$^2$ to the volume of piston chamber 499 measured in in.$^3$ to the volume of bellows chamber 498 measured in in.$^3$ is in the range of ratios of from about 1:403:2,346 to about 1:61,111:333,333. This is an inclusive range that could be alternatively expressed as 1:403-61,111: 2,346-333,333, including any combination of ratios in between, and, for example, would necessarily include the following ratios 1:403:333,333 and 1:61,111:2,346.

More specifically, when the axle (not shown) of the axle/suspension system (not shown) experiences a jounce event, such as when the vehicle wheels encounter a curb or a raised bump in the road, the axle moves vertically upwardly toward the vehicle chassis. In such a jounce event, bellows chamber 498 is compressed by the axle/suspension system (not shown) as the wheels of the vehicle travel over the curb or the raised bump in the road. The compression of air spring bellows chamber 498 causes the internal pressure of the bellows chamber to increase. Therefore, a pressure differential is created between bellows chamber 498 and piston chamber 499. This pressure differential causes air to flow from bellows chamber 498, through threaded rod opening 495, through conduit 494 and into piston chamber 499. The flow of air between bellows chamber 498 into piston chamber 499 through threaded rod opening 495 and conduit 494 causes damping to occur. As an additional result of the air flow through threaded rod opening 495 and conduit 494, the pressure differential between bellows chamber 498 and piston chamber 499 is reduced. Air continues to flow through threaded rod opening 495 and conduit 494 until the pressure of piston chamber 499 and bellows chamber 498 have equalized.

Conversely, when the axle (not shown) of the axle/suspension system (not shown) experiences a rebound event, such as when the vehicle wheels encounter a large hole or depression in the road, the axle moves vertically downwardly away from the vehicle chassis. In such a rebound event, bellows chamber 498 is expanded by the axle/suspension system (not shown) as the wheels of the vehicle travel into the hole or depression in the road. The expansion of air spring bellows chamber 498 causes the internal pressure of the bellows chamber to decrease. As a result, a pressure differential is created between bellows chamber 498 and piston chamber 499. This pressure differential causes air to flow from piston chamber 499, through conduit 494, through threaded rod opening 495, and into bellows chamber 498. The flow of air through conduit 494 and threaded rod opening 495 causes damping to occur. As an additional result of the air flow through conduit 494 and threaded rod opening 495, the pressure differential between bellows chamber 498 and piston chamber 499 is reduced. Air will continue to flow through conduit 494 and threaded rod opening 495 until the pressure of piston chamber 499 and bellows chamber 498 have equalized. When little or no suspension movement has occurred over a period of several seconds, the pressure of bellows chamber 498 and piston chamber 499 can be considered equal.

As a result of attaching circular disc 470 with openings 496 to piston 442 and providing threaded rod opening 495 and conduit 494, a non-damping air spring such as prior art air spring 24, may be converted to an air spring that includes damping characteristics such as third exemplary embodiment air spring 424 of the present invention. In this manner, the axle/suspension system (not shown) does not require a shock absorber to provide damping to the axle/suspension system, thus reducing the weight of the axle/suspension system. Third exemplary embodiment air spring 424 of the present invention provides damping characteristics without requiring a custom design and manufacturing process, as an existing designed and manufactured piston 442 is utilized, resulting in a desirable decrease in design and manufacturing costs when compared to a prior art air spring with damping characteristics, such as prior art air spring 124 (FIG. 4). As a result, air spring 424 of the present invention converts non-damping air springs, such as prior art air spring 24 (FIG. 1), to an air spring with damping characteristics in an economical manner, without an undesirable increase in manufacturing and design costs, and also avoiding the potential deficiencies of the "take-apart" air spring design.

It should be understood that third exemplary embodiment air spring 424 could also be utilized in conjunction with a "take-apart" air spring design having an open bottom, without changing the overall concept or operation of the present invention. In such an application, disc 470 including threaded rod 488 and conduit 494 is attached to the open bottom of the piston of the "take-apart" air spring design, and as a result, allows a non-damping "take-apart" air spring design to be converted to a damping "take-apart" air spring design that has damping characteristics similar to the "molded-in" air spring design described above.

Figure 12:
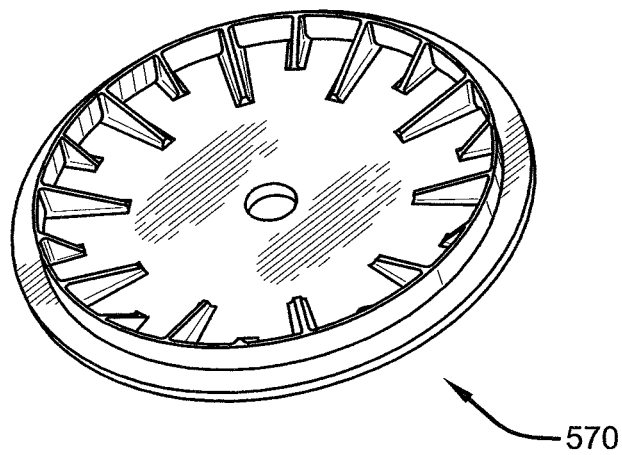
FIG. 12 is a top perspective view of an alternative configuration of the disc shown in FIGS. 5-10.
Figure 13:
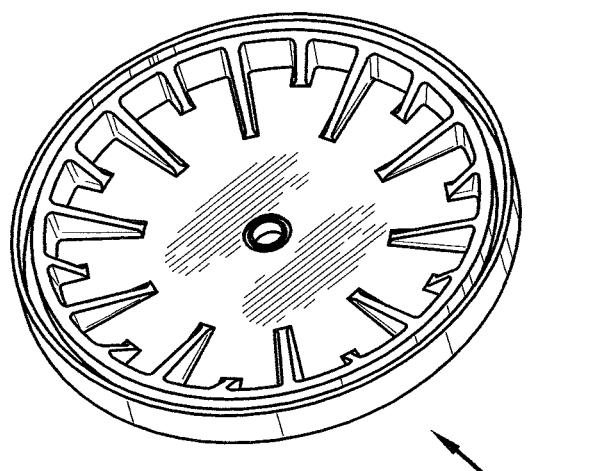
FIG. 13 is a top perspective view of another configuration of the disc shown in FIGS. 5-10.

Referring now to FIGS. 12 and 13, discs 570 and 670 are alternative configurations of discs that can be attached or mated to the bottom of a piston, utilizing all types of attachments including friction welding, soldering, coating, crimping, welding, snapping, screwing, O-ring, sonic, glue, press, melting, expandable sealant, press-fit, bolt, latch, spring, adhesive bond, laminate, tape, tack, adhesive, shrink fit, and the like, and/or any combination listed, without changing the overall concept or operation of the present invention. It is even contemplated that discs 570 and 670 may be composed of materials known by those in the art other than metal, plastic, and/or composite material without changing the overall concept or operation of the present invention.

The air spring for heavy-duty vehicles with damping characteristics of the present invention overcomes the problems associated with prior art air springs by eliminating the use of shock absorbers while converting a non-damping air spring with a "molded-in" end closure into an air spring that provides damping characteristics. It also allows for the use of different piston/pedestal combinations to be used in the air spring so that the volume of the piston can be varied along with the opening size between the piston chamber and the bellows chamber to optimize the damping characteristics of the air spring. Additionally, the air spring for heavy-duty vehicles with damping characteristics of the present invention provides an air spring with damping characteristics that may be optimized for different uses without requiring custom designed and manufactured air springs for a specific application as required by prior art air springs with damping characteristics.

The present invention also includes a method of converting a non-damping air spring to an air spring with damping characteristics. The method includes steps in accordance with the description and structure that is presented above and shown in FIGS. 5-13.

It is contemplated that exemplary embodiment air springs 224,324,424 of the present invention could be utilized on tractor-trailers or heavy-duty vehicles, such as buses, trucks, trailers and the like, having one or more than one axle without changing the overall concept or operation of the present invention. It is further contemplated that exemplary embodiment air springs 224,324,424 could be utilized on vehicles having frames or subframes which are moveable or non-movable without changing the overall concept or operation of the present invention. It is yet even further contemplated that exemplary embodiment air springs 224,324,424 could be utilized on all types of air-ride leading and/or trailing arm beam-type axle/suspension system designs known to those skilled in the art without changing the overall concept or operation of the present invention. It is also contemplated that exemplary embodiment air springs 224,324,424 could be utilized on axle/suspension systems having an overslung/top-mount configuration or an underslung/bottom-mount configuration, without changing the overall concept or operation of the present invention. It is also contemplated that exemplary embodiment air springs 224,324,424 could be utilized in conjunction with other types of air-ride rigid beam-type axle/suspension systems such as those using U-bolts, U-bolt brackets/axle seats and the like, without changing the overall concept or operation of the present invention. It is further contemplated that exemplary embodiment air springs 224,324,424 could be formed from various materials, including composites, metal and the like, without changing the overall concept or operation of the present invention. It is even contemplated that exemplary embodiment air springs 224,324,424 could be utilized in combination with prior art shock absorbers and other similar devices and the like, without changing the overall concept or operation of the present invention.

It is contemplated that discs 270,370,470,570,670 may be attached to pistons 242,342,442, respectively, utilizing other attachments such as friction welding, vibration, soldering, coating, crimping, welding, snapping, screwing, O-ring, sonic, glue, press, melting, expandable sealant, press-fit, bolt, latch, spring, adhesive bond, laminate, tape, tack, adhesive, shrink fit, and/or any combination listed without changing the overall concept or operation of the present invention. It is even contemplated that discs 270,370,470, 570,670 may be composed of materials known by those in the art other than metal, plastic, and/or composite material without changing the overall concept or operation of the present invention.

It is contemplated that openings 274,275,374,375 of first and second exemplary embodiments 224,324 could be formed in a different location within retaining plates 286,386 and top plates 282,382 of pistons 242,342, respectively, without changing the overall concept or operation of the present invention. It is further contemplated that any number of openings 274,275,374,375 may be formed in retaining plates 286,386 and top plates 282,382 of pistons 242,342, respectively, such as multiple small openings without changing the overall concept or operation of the present invention.

It is contemplated that discs 270,370,470,570,670 may extend vertically further up vertical sidewalls 391,491 without changing the overall concept or operation of the present invention. It is also contemplated that discs 270,370,470570, 670 could have variable thicknesses being either uniform or non-uniform, without changing the overall concept or operation of the present invention. It is even contemplated that lip 278 may extend vertically higher without changing the overall concept or operation of the present invention. It is further contemplated that discs 270,470,570,670 may include structure to directly attach to each respective beam 18 similar to the structure of disc 370 without changing the overall concept or operation of the present invention. It is even further contemplated that discs 270,370,470,570,670 could include a groove to facilitate a sealing attachment to pistons 242,342,442, respectively, without changing the overall concept or operation of the present invention.

It is contemplated that disc 470 may include any number of openings 496 and/or the openings located in a different location within the respective disc without changing the overall concept or operation of the present invention.

It is contemplated that conduit 494 may be composed of flexible materials such as rubber, plastic or other materials known to those skilled in the art without changing the overall concept or operation of the present invention. It is further contemplated that threaded rod 488 may include a conduit or other means disposed in opening 495 to facilitate fluid communication, without changing the overall concept or operation of the present invention The present invention has been described with reference to specific embodiments. It is to be understood that this illustration is by way of example and not by way of limitation. Potential modifications and alterations will occur to others upon a reading and understanding of this disclosure, and it is understood that the invention includes all such modifications and alterations and equivalents thereof.

Accordingly, the air spring with damping characteristics for heavy-duty vehicles is simplified, provides an effective, safe, inexpensive and efficient structure and method which achieves all the enumerated objectives, provides for eliminating difficulties encountered with prior art air springs for heavy-duty vehicles, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the air spring with damping characteristics for heavy-duty vehicles is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. An air spring with damping characteristics for a suspension assembly of a heavy-duty vehicle comprising:
a bellows and a piston, said bellows including a bellows chamber, the bellows connected to a main member of said heavy-duty vehicle, said bellows to directly connected to a retaining plate which is in turn mounted on a top plate of said piston, the piston having an open bottom, said open bottom of said piston being sealingly closed by a disc attached to the open bottom, whereby the piston and said disc define a piston chamber, said piston mounted on said suspension assembly of said heavy-duty vehicle, said bellows chamber and said piston chamber being in fluid communication with each other via aligned openings formed in said retaining plate and said piston top plate, wherein airflow between the bellows chamber and the piston chamber provides damping to the suspension assembly of said heavy-duty vehicle.

2. The air spring with damping characteristics for a suspension assembly of a heavy-duty vehicle of claim 1, said piston further comprising a flared portion and a piston sidewall, said disc being generally circular-shaped, further comprising a continuous raised lip, wherein said continuous raised lip is formed on a disc top surface along a periphery of said disc, with said continuous raised lip disposed generally between said flared portion and said piston sidewall for reinforcing said attachment of said disc to said piston.

3. The air spring with damping characteristics for a suspension assembly of a heavy-duty vehicle of claim 1, said disc further comprising a groove formed in a top surface of said disc disposed circumferentially around said disc, and configured to mate with a lower surface of said piston for reinforcing said attachment of said disc to said piston.

4. The air spring with damping characteristics for a suspension assembly of a heavy-duty vehicle of claim 3, an O-ring being disposed in said groove for reinforcing said attachment of said disc to said piston.

5. The air spring with damping characteristics for a suspension assembly of a heavy-duty vehicle of claim 1, said piston further comprising a piston sidewall and a central hub, said disc being generally cup-shaped, further comprising a base, a vertical sidewall, and a central portion, wherein said base mates with a lower surface of said piston sidewall, said vertical sidewall mates with said piston, and said central portion mates with said central hub for reinforcing said attachment of said disc to said piston.

6. The air spring with damping characteristics for a suspension assembly of a heavy-duty vehicle of claim 1, said bellows chamber including a volume of from about 305 in.$^3$ to about 3000 in.$^3$.

7. The air spring with damping characteristics for a suspension assembly of a heavy-duty vehicle of claim 1, said piston chamber including a volume of from about 105 in.$^3$ to about 550 in.$^3$.

8. The air spring for a heavy-duty vehicle of claim 1, wherein said aligned openings form a continuous opening including a cross sectional area of from about 0.009 in.$^2$ to about 0.13 in.$^2$.

9. The air spring for a heavy-duty vehicle of claim 1, wherein said aligned openings form a continuous opening whereby a ratio of a cross sectional area of said continuous opening measured in in.$^2$ to a volume of said piston chamber measured in in.$^3$ to a volume of said bellows chamber measured in in.$^3$ is in a range of ratios of from about 1:403:2,346 to about 1:61,111:333,333.

10. The air spring with damping characteristics for a suspension assembly of a heavy-duty vehicle of claim 1, said aligned openings comprising:
  a threaded rod, said threaded rod formed with an opening through a length of the threaded rod, said threaded rod disposed between and in fluid communication with said bellows chamber and said piston chamber.

11. The air spring with damping characteristics for a suspension assembly of a heavy-duty vehicle of claim 10, said air spring further comprising a conduit, said conduit providing fluid communication between said threaded rod opening and said piston chamber.

12. The air spring with damping characteristics for a suspension assembly of a heavy-duty vehicle of claim 1, said attachment of said disc to said open bottom of said piston comprises and adhesive bond or a friction weld.

13. A method for converting a non-damping air spring into an air spring with damping characteristics for a suspension assembly of a heavy-duty vehicle, comprising the following steps:
  a) providing a bellows and a piston, said bellows including a bellows chamber, the bellows connected to a main member of said heavy-duty vehicle, said bellows directly connected to a retaining plate which is in turn mounted on a top plate of said piston, the piston having an open bottom,
  b) sealingly closing said open bottom of said piston by attaching a disc to the open bottom, whereby the piston and said disc define a piston chamber, said piston mounted on said suspension assembly of the heavy-duty vehicle, said bellows chamber and said piston chamber being in fluid communication with each other via aligned openings formed in said retaining plate and said piston top plate, wherein airflow between the bellows chamber and the piston chamber provides damping to the suspension assembly of said heavy-duty vehicle.

14. The method for converting a non-damping air spring into an air spring with damping characteristics for a suspension assembly of a heavy-duty vehicle of claim 13, said piston further comprising a flared portion and a piston sidewall, said disc being generally circular-shaped, further comprising a continuous raised lip, wherein said continuous raised lip is formed on a disc top surface along a periphery of said disc, with said continuous raised lip disposed generally between said flared portion and said piston sidewall for reinforcing said attachment of said disc to said piston.

15. The method for converting a non-damping air spring into an air spring with damping characteristics for a suspension assembly of a heavy-duty vehicle of claim 13, said disc further comprising a groove formed in a top surface of said disc disposed circumferentially around said disc, and configured to mate with a lower surface of said piston for reinforcing said attachment of said disc to said piston.

16. The method for converting a non-damping air spring into an air spring with damping characteristics for a suspension assembly of a heavy-duty vehicle of claim 15, an O-ring being disposed in said groove for reinforcing said attachment of said disc to said piston.

17. The method for converting a non-damping air spring into an air spring with damping characteristics for a suspension assembly of a heavy-duty vehicle of claim 13, said piston further comprising a piston sidewall, and a central hub, said disc being generally cup-shaped, further comprising a base, a vertical sidewall, and a central portion, wherein said base mates with a lower surface of said piston sidewall, said vertical sidewall mates with said piston, and said central portion mates with said central hub for reinforcing said attachment of said disc to said piston.

18. The method for converting a non-damping air spring into an air spring with damping characteristics for a suspension assembly of a heavy-duty vehicle of claim 13, said bellows chamber including a volume of from about 305 in.$^3$ to about 3000 in.$^3$.

19. The method for converting a non-damping air spring into an air spring with damping characteristics for a suspension assembly of a heavy-duty vehicle of claim 13, The air spring with damping characteristics for a suspension assembly of a heavy-duty vehicle of claim 1, said piston chamber including a volume of from about 105 in.$^3$ to about 550 in.$^3$.

20. The method for converting a non-damping air spring into an air spring with damping characteristics for a suspension assembly of a heavy-duty vehicle of claim 13, wherein said aligned openings form a continuous opening including a cross sectional area of from about 0.009 in.$^2$ to about 0.13 in.$^2$.

21. The method for converting a non-damping air spring into an air spring with damping characteristics for a suspension assembly of a heavy-duty vehicle of claim 13, wherein said aligned openings form a continuous opening whereby a ratio of a cross sectional area of said continuous opening measured in in.$^2$ to a volume of said piston chamber measured in in.$^3$ to a volume of said bellows chamber measured in in.$^3$ is in a range of ratios of from about 1:403:2346 to about 1:61, 111:333,333.

22. The method for converting a non-damping air spring into an air spring with damping characteristics for a suspension assembly of a heavy-duty vehicle of claim 13, said aligned openings comprising:
  a threaded rod, said threaded rod formed with an opening through a length of the threaded rod, said threaded rod disposed between and in fluid communication with said bellows chamber and said piston chamber.

23. The method for converting a non-damping air spring into an air spring with damping characteristics for a suspension assembly of a heavy-duty vehicle of claim 22, said air spring further comprising a conduit attached to and in fluid communication with said threaded rod opening, said conduit providing fluid communication between said threaded rod opening and said piston chamber.

24. The method for converting a non-damping air spring into an air spring with damping characteristics for a suspension assembly of a heavy-duty vehicle of claim 13, said attachment of said disc to said open bottom of said piston comprises an adhesive bond or a friction weld.

\* \* \* \* \*

UNITED STATES PATENT AND TRADEMARK OFFICE
CERTIFICATE OF CORRECTION

PATENT NO. : 9,738,131 B2  
APPLICATION NO. : 15/150505  
DATED : August 22, 2017  
INVENTOR(S) : Michael J. Keeler et al.

It is certified that error appears in the above-identified patent and that said Letters Patent is hereby corrected as shown below:

In the Claims

Claim 12, Column 23, Line 18, after the word "comprises" replace the word "and" with the word --an--.

Claim 19, Column 24, Line 20, after the words "claim 13," delete the words "The air spring with damping characteristics for a suspension assembly of a heavy-duty vehicle of claim 1,".

Claim 21, Column 24, Line 38, after the word "about" replace "1:61, 111:333,333" with --1:16,111:333,333--.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*